US012609890B2

(12) United States Patent
Yang

(10) Patent No.: US 12,609,890 B2
(45) Date of Patent: Apr. 21, 2026

(54) NETWORK SWITCH AND NETWORK ARCHITECTURE FOR HETEROGENEOUS NETWORK COUPLING AND BACKUP

(71) Applicant: Moxa Inc., New Taipei City (TW)

(72) Inventor: Tsai-Wei Yang, New Taipei City (TW)

(73) Assignee: Moxa Inc., New Taipei City (TW)

( * ) Notice: Subject to any disclaimer, the term of this patent is extended or adjusted under 35 U.S.C. 154(b) by 216 days.

(21) Appl. No.: 18/512,042

(22) Filed: Nov. 17, 2023

(65) Prior Publication Data

US 2025/0088457 A1 Mar. 13, 2025

(30) Foreign Application Priority Data

Sep. 13, 2023 (TW) .................................. 112134853

(51) Int. Cl.
*H04L 45/28* (2022.01)
*H04L 41/0604* (2022.01)
*H04L 45/745* (2022.01)

(52) U.S. Cl.
CPC .......... *H04L 45/28* (2013.01); *H04L 41/0627* (2013.01); *H04L 45/745* (2013.01)

(58) Field of Classification Search
CPC ................................. H04L 41/12; H04L 49/111
See application file for complete search history.

(56) References Cited

U.S. PATENT DOCUMENTS

| | | | |
|---|---|---|---|
| 9,191,273 B2 * | 11/2015 | Kleineberg | ............. H04L 41/12 |
| 10,476,698 B2 | 11/2019 | Chikkamath | |
| 2002/0133622 A1 * | 9/2002 | Pinto | ..................... H04L 49/111 370/254 |

(Continued)

FOREIGN PATENT DOCUMENTS

| | | |
|---|---|---|
| CN | 111711583 A | 9/2020 |
| JP | 2009-105690 A | 5/2009 |

(Continued)

OTHER PUBLICATIONS

User Manual, Redundancy Configuration Industrial Ethernet Switch RS20, RSB20, Jul. 2010, p. 28-31, 68-71, Hirschmann Automation and Control GmbH, Neckartenzlingen, Germany.

(Continued)

*Primary Examiner* — John A Follansbee
*Assistant Examiner* — Christopher P Cadorna
(74) *Attorney, Agent, or Firm* — Winston Hsu

(57) ABSTRACT

A primary network switch, configured in a main network operating with a first redundancy protocol, is used for coupling a subnet operating with a second redundancy protocol, and the primary network switch executes a backup method. The backup method includes sending a first control packet through at least one first port; in response to sending the first control packet, receiving an ACK packet of the first control packet; and in response to receiving the ACK packet of the first control packet, switching a state of a second port, sending a second control packet through the at least one first port according to the first redundancy protocol so as to update a MAC address table of the main network, and sending a third control packet through the second port according to the second redundancy protocol to update a MAC address table of the subnet.

30 Claims, 20 Drawing Sheets

(56) References Cited

U.S. PATENT DOCUMENTS

| | | | |
|---|---|---|---|
| 2009/0109841 A1* | 4/2009 | Nozaki | H04L 45/76 |
| | | | 370/218 |
| 2014/0025833 A1 | 1/2014 | Kiessling | |
| 2014/0040657 A1 | 2/2014 | Kiessling | |
| 2014/0185427 A1 | 7/2014 | Ditzel, III | |
| 2019/0173782 A1 | 6/2019 | Soliman | |
| 2022/0368561 A1 | 11/2022 | Schlennert | |

FOREIGN PATENT DOCUMENTS

| | | | |
|---|---|---|---|
| TW | I612783 B | 1/2018 | |
| TW | 201804763 A | 2/2018 | |

OTHER PUBLICATIONS

Siemens post entitled "What options do you have for connecting an (R)STP segment to a ring structure and how can you reduce the ring reconfiguration time through the EPLC procedure?", posted Apr. 25, 2018. Retrieved from Internet: <https://support.industry.siemens.com/cs/document/77363773/what-options-do-you-have-for-connecting-an-(r)stp-segment-to-a-ring-structure-and-how-can-you-reduce-the-ring-reconfiguration-time-through-the-eplc-procedure-?dti=0&Ic=en-TW>.

Broadcom, "BCM56070 Switch Programming Guide", Broadcom, Aug. 12, 2020. https://docs.broadcom.com/doc/56070-PG2-PUB , Aug. 12, 2020.

IEEE Standards for Local and Metropolitan Area Networks: Media Access Control (MAC) Bridges, ANSI, IEEE Std 802.1D-1990, Mar. 8, 1991, SH13565, p. 57, DOI: 10.1109/IEEESTD.1991.101050 , Mar. 8, 1991.

* cited by examiner

Figure 10:
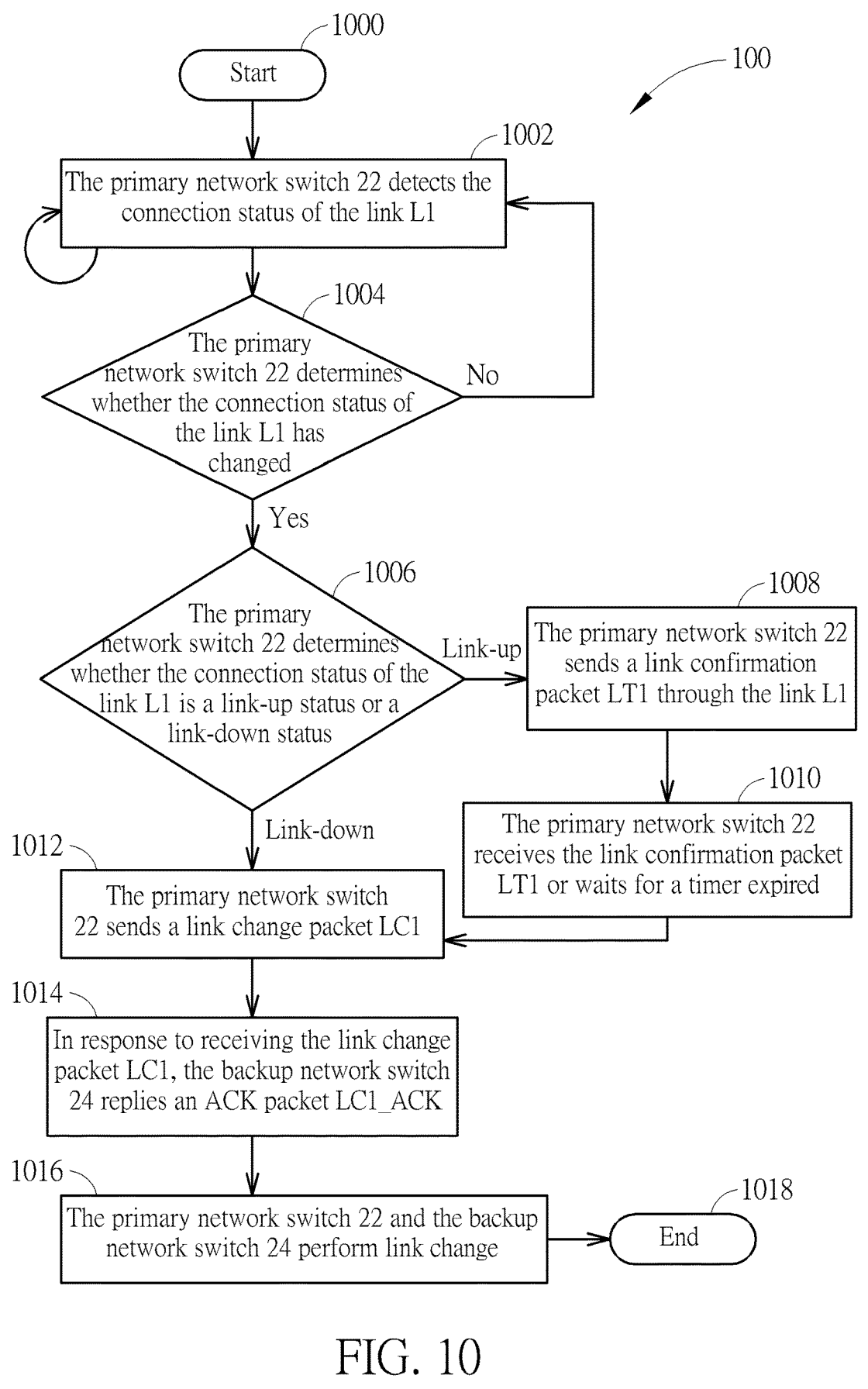

1000

Start

1002

The primary network switch 22 detects the connection status of the link L1

1004

The primary network switch 22 determines whether the connection status of the link L1 has changed No Yes

1006

The primary network switch 22 determines whether the connection status of the link L1 is a link-up status or a link-down status Link-up

1008

The primary network switch 22 sends a link confirmation packet LT1 through the link L1

1010

The primary network switch 22 receives the link confirmation packet LT1 or waits for a timer expired Link-down

1012

The primary network switch 22 sends a link change packet LC1

1014

In response to receiving the link change packet LC1, the backup network switch 24 replies an ACK packet LC1_ACK

1016

The primary network switch 22 and the backup network switch 24 perform link change

1018

End

NETWORK SWITCH AND NETWORK
ARCHITECTURE FOR HETEROGENEOUS
NETWORK COUPLING AND BACKUP

BACKGROUND OF THE INVENTION

1. Field of the Invention

The present invention relates to a network switch and network architecture or network coupling and backup, and more particularly, to a network switch and network architecture for heterogeneous network coupling and backup.

2. Description of the Prior Art

With the burgeoning demand for capacity and cost-efficiency in the industry, network connectivity for production equipment has become a growing trend. The network connectivity enables cross-machine data collection and analysis, enhancing the speed, flexibility, and efficiency of the manufacturing processes. It also leads to the production of higher quality products and cost reduction.

However, traditional industrial environments often consist of multiple independent Local Area Networks (LANs), causing complicate integration and management. In this situation, network coupling technology has been proposed, which connects multiple LANs to facilitate data and function sharing or integration across different LANs. This technology solves the interoperability and compatibility issues across different LANs and improves the system efficiency and scalability.

In general, industrial control network architectures may necessitate multiple subnets to access the main network (backbone network). Most of the industrial control networks employ redundancy protocols, such as Rapid Spanning Tree Protocol (RSTP), Media Redundancy Protocol (MRP) in the subnets, and High-availability Seamless Redundancy (HSR) or a private redundancy protocol customized by the switch manufacturer in the main networks, to ensure stability and reliability. However, for effective operation during network coupling, both the main network and the connected subnets typically need to use the same redundancy protocol. This poses a challenge when different redundancy protocols are in use, making the network architecture expansion difficult.

Previous technologies have proposed methods for coupling heterogeneous networks, but they come with various limitations concerning the connectivity and devices involved in network coupling. For example, the primary path and the backup path of subnets must connect to adjacent network nodes in the main network, the network nodes used for connections have to simultaneously support two different redundancy protocols for the main network and subnet, or the main network has to relay control packets with the redundancy protocol required by the subnet. In such scenarios, maintaining the performance of network nodes and the main network becomes challenging, especially when dealing with a large number of connected subnets.

SUMMARY OF THE INVENTION

Therefore, the purpose of the present invention is to provide a method and device for coupling heterogeneous networks, where the main network and subnets are able to operate under different redundancy protocols when performing network coupling, enhancing performance while realizing redundancy mechanisms.

An embodiment of the present invention discloses a primary network switch, configured in a main network operating with a first redundancy protocol for coupling a subnet operating with a second redundancy protocol. The primary network switch includes at least one first port, a second port, a processing unit and a storage unit. The at least one first port is coupled to the main network, and the second port is coupled to the subnet. The processing unit is configured to execute a program code. The storage unit is coupled to the processing unit and configured to store the program code to instruct the processing unit to execute a backup method for network coupling. The backup method includes sending a first control packet through the at least one first port; in response to sending the first control packet, receiving an acknowledgement (ACK) packet of the first control packet; and in response to receiving the ACK packet of the first control packet, switching a state of the second port, sending a second control packet through the at least one first port according to the first redundancy protocol to update a MAC address table of the main network, and sending a third control packet through the second port according to the second redundancy protocol to update a MAC address table of the subnet.

An embodiment of the present invention further discloses a backup network switch, configured in a main network operating with a first redundancy protocol for coupling a subnet operating with a second redundancy protocol. The backup network switch includes at least one first port, a second port, a processing unit and a storage unit. The at least one first port is coupled to the main network, and the second port is coupled to the subnet. The processing unit is configured to execute a program code. The storage unit is coupled to the processing unit and configured to store the program code to instruct the processing unit to execute a backup method for network coupling. The backup method includes switching a state of the second port; and sending a first control packet to update a MAC address table of the main network through the at least one port according to the first redundancy protocol; and sending a second control packet to update a MAC address table of the subnet through the second port according to the second redundancy protocol.

An embodiment of the present invention further discloses a network architecture for network coupling, including a subnet, a main network, a primary network switch and a backup network switch. The subnet operates with a first redundancy protocol, and the main network operates with a second redundancy protocol. The primary network switch is disposed in the main network, coupled to the main network through at least one first port and coupled to the subnet through a second port. The backup network switch is disposed in the main network, coupled to the main network through at least third port and coupled to the subnet through a fourth port. The primary network switch and the backup network switch execute a backup method for network coupling, and the backup method includes sending, by the primary network switch, a first control packet through the at least one first port; in response to receiving the first control packet, the backup network switch sending an acknowledgement (ACK) packet of the first control packet and performing link change, sending a second control packet to update a MAC address table of the main network through the at least third port according to the second redundancy protocol, and sending a third control packet to update a MAC address table of the subnet through the fourth port according to the first redundancy protocol; and in response to receiving the ACK packet of the first control packet, the primary network switch performing link change, sending a fourth control packet to update the MAC address table of the main network through the at least one first port according to the second redundancy protocol, and sending a fifth control packet to update the MAC address table of the subnet through the second port according to the first redundancy protocol.

These and other objectives of the present invention will no doubt become obvious to those of ordinary skill in the art after reading the following detailed description of the pre-ferred embodiment that is illustrated in the various figures and drawings.

BRIEF DESCRIPTION OF THE DRAWINGS

FIG. 10 is a schematic diagram of a link change process of a backup method for network coupling according to an embodiment of the present invention.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical con-nection via other devices and connections.

Figure 1:
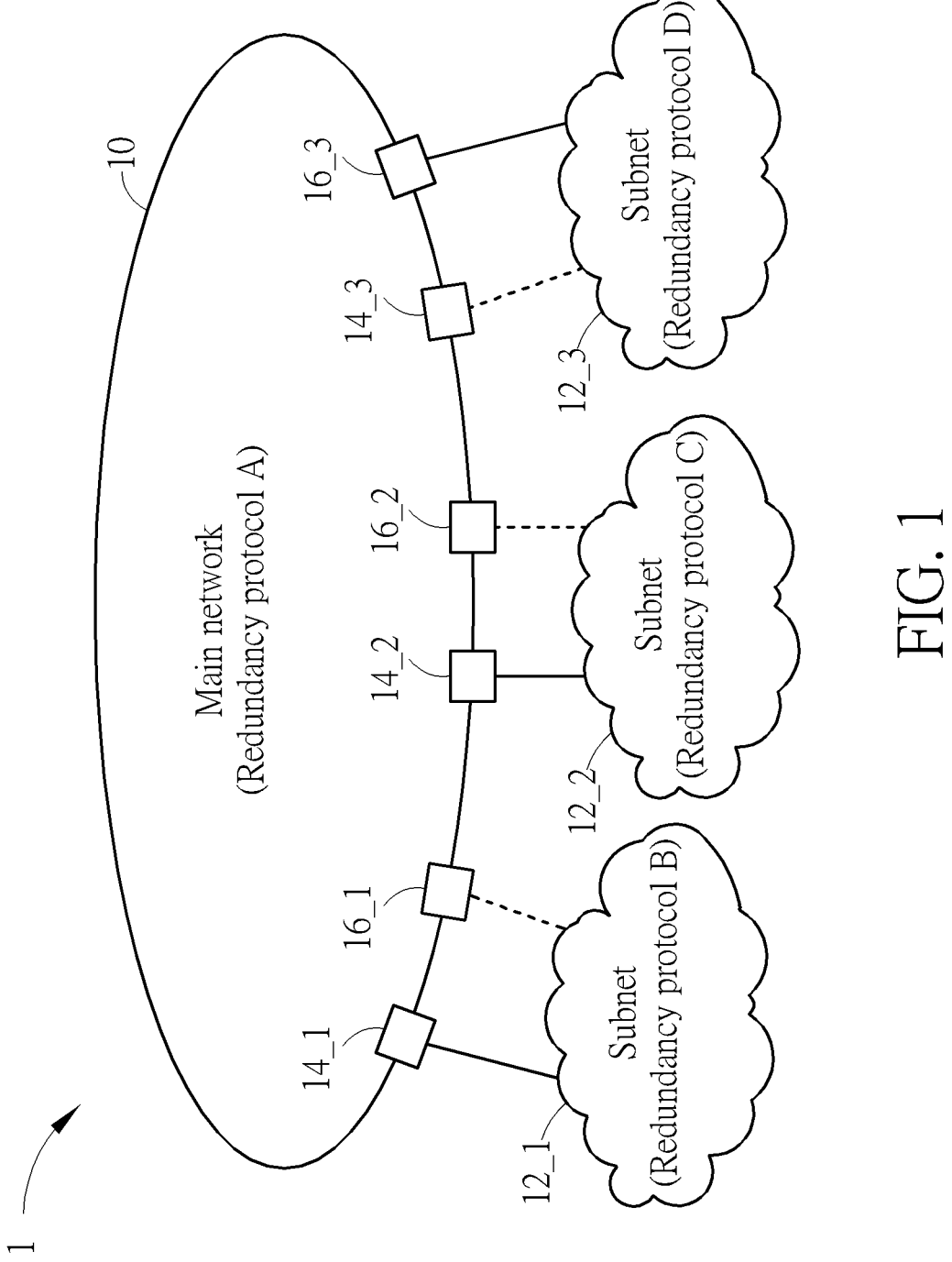
FIG. 1 is a schematic diagram of a network system.

Please refer to FIG. 1, which is a schematic diagram of a network system 1. In the network system 1, a main network 10 is coupled to a plurality of subnets 12_1-12_3. The main network 10 operates according to a redundancy protocol A, and the subnets 12_1-12_3 operate according to redundancy protocols B-D respectively. Specifically, the main network 10 is coupled to the subnet 12_1-12_3 through a plurality of primary links via a plurality of primary network switches 14_1-14_3, and the main network 10 is further coupled to the subnet 12_1-12_3 through a plurality of backup links via a plurality of backup network switches 16_1-16_3 simulta-neously. The plurality of backup network switches 16_1-16_3 and the corresponding backup links serve as backups for the plurality of primary network switches 14_1-14_3 and the corresponding primary links, and are in a standby state. As can be seen in FIG. 1, the network system 1 has a situation where multiple networks using different redun-dancy protocols are coupled. In the prior art, the network switches used to connect subnets may have to run two different redundancy protocols at the same time. For example, the network switches 14_1 and 16_1 need to run redundancy protocols A and B at the same time, the network switches 14_2 and 16_2 need to run redundancy protocols A and B at the same time, and the network switches 14_3 and 16_3 need to run redundancy protocols A and D at the same time. This operation method causes a huge performance burden on the network switches. On the other hand, in the prior art, the entire main network 10 may be regarded as a single path, and the control packets related to the redun-dancy protocols of the subnets 12_1-12_3 are forwarded through the main network 10. In this situation, when coupled subnets increase, the amount of control packets transmitted through the main network 10 also increases greatly, impact-ing performance. Furthermore, in the prior art, coupling networks for more than two redundancy protocols at the same time may not be feasible.

Therefore, the present invention provides a backup method of network coupling for a network architecture and the network switches thereof to improve the shortcomings of the prior art, where the primary network switch, the backup network switch and the links connected to the subnet may be regarded as a coupling network and serve as a communica-tion bridge between the main network and the subnet. When the network switch performs network backup such as link change, the main network and the subnet may be notified with the information about the new path according to the redundancy protocols running on the main network and subnet respectively. Accordingly, the main network and the subnet are able to communicate with each other while running independently according to different redundancy protocols without interfering with each other, bringing stable performance.

Figure 2:
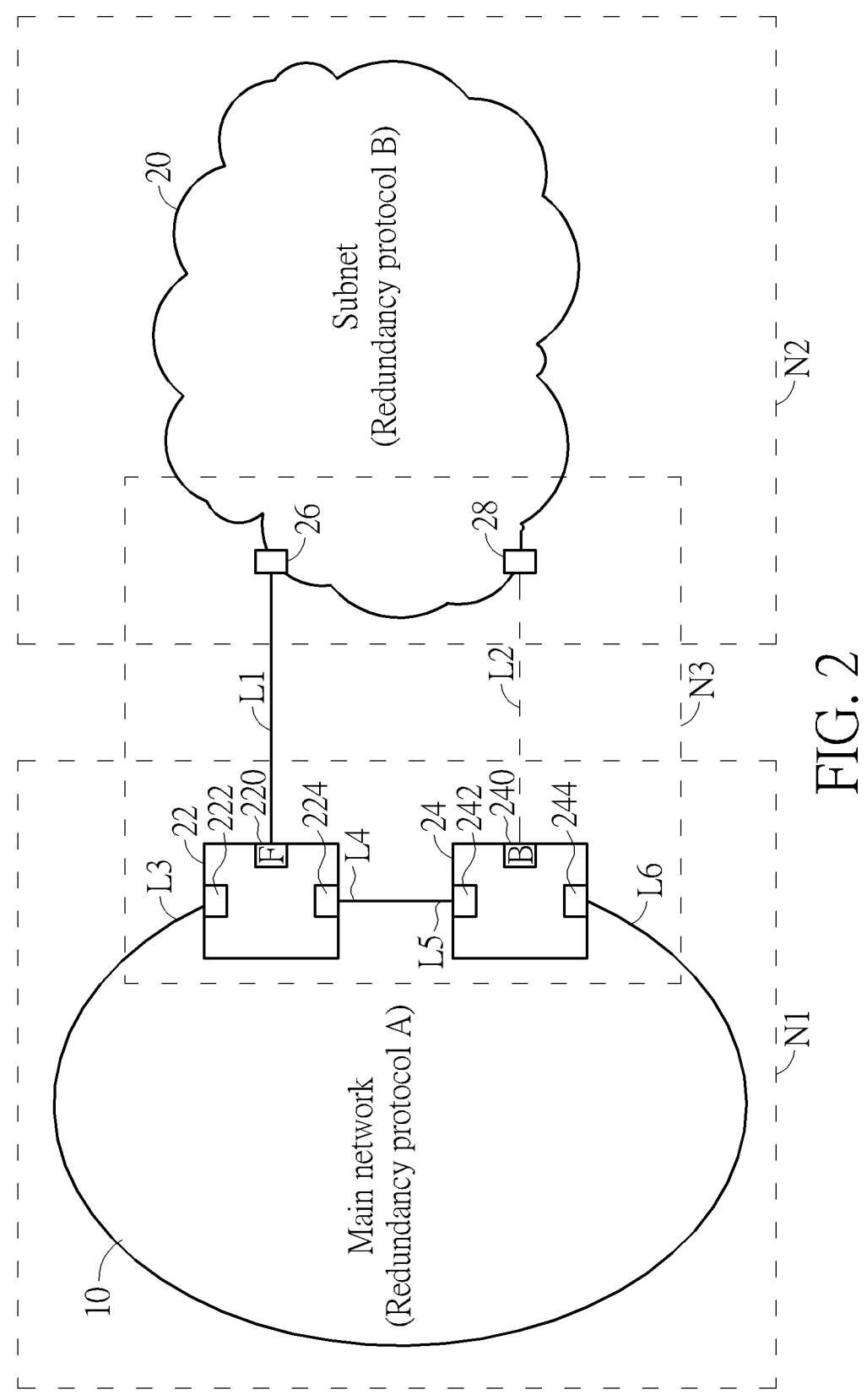
FIG. 2 is a schematic diagram of a part of a network system according to an embodiment of the present inven-tion.

Please refer to FIG. 2, which is a part of the network system 1 in FIG. 1. Specifically, FIG. 2 illustrates the connection between the main network 10, a subnet 20, a primary network switch 22 and a backup network switch 24 in the embodiment of the present invention. In FIG. 2, the subnet 20 may be any of the subnets 12_1-12_3 of the network system 1 in FIG. 1, where the primary network switch 22 represents the primary network switch corresponding to the subnet 20 among the primary network switches 14_1-14_3, and the backup network switch 24 represents the backup network switch corresponding to the subnet 20 among the backup network switches 16_1-16_3. As shown in FIG. 2, the primary network switch 22 deployed in the main network 10 is connected to the main network 10 through links L3 and L4 via ports 222 and 224, and is connected to the subnet 20 through link L1 via a port 220 to forward data. On the other hand, the backup network switch 24 deployed in the main network 10 is connected to the main network 10 through links L5 and L6 via ports 242 and 244, and is connected to the subnet 20 through link L2 via a port 240 to be on standby as a backup for the primary network switch 22. It should be noted, the main network 10 is illustrated as a ring network in FIG. 2, and is not limited thereto. The main network 10 may be any types of network topologies and for different redundancy protocols. Thus, although the primary network switch 22 and the backup network switch 24 are illustrated as being connected to the main network 10 through 2 ports, but is not limited thereto. The primary network switch may connect to the main network with different numbers of ports and links depending on the network topology. In addition, the primary network switch 22 and the backup network switch 24 are illustrated to be adjacent to each other in FIG. 2, but is not limited thereto. The primary network switch 22 and the backup network switch 24 may be adjacent to each other (links L4 and L5 are the same link), or may be connected via other network devices (not shown in FIG. 2) in the main network 10 (links L4 and L5 are different links).

In the embodiment of FIG. 2, the network system 1 may be regarded as consisting of three networks N1-N3 operating a redundancy mechanism. The network N1 is the main network 10 including the primary network switch 22 and the backup network switch 24, and operates according to the redundancy protocol A. When any device or link in the network N1 fails, backup may be performed according to the operation mechanism of redundancy protocol A. The network N2 is the subnet 20 including the network switches 26 and 28, and operates according to the redundancy protocol B. When any device or link in the network N2 fails, backup may be performed according to the operation mechanism of redundancy protocol B. The network N1 and the network N2 operate according to different redundancy protocols and do not interfere with each other. On the other hand, the network N3 comprises the primary network switch 22, the back network switch 24, the network switches 26 and 28 and the links L1 and L2, which are the aforementioned coupling network. When any device or link in the network N3 fails, the link L1 and the link L2 are switched without affecting the operation of different redundancy protocols in the main network 10 and the sub-network 20. Specifically, when link switching is performed in the network N3, the primary network switch 22 and the backup network switch 24 may send a notification of topology change to the main network 10 through the ports 222, 224 and the ports 242, 244 respectively according to the redundancy protocol A. At the same time, the primary network switch 22 and the backup network switch 24 may also send a notification of topology change to the subnet 20 according to the redundancy protocol B through the port 220 and the port 240 respectively. Accordingly, the network coupling is able to get rid of the limitations caused by the different redundancy protocols.

Figure 3:
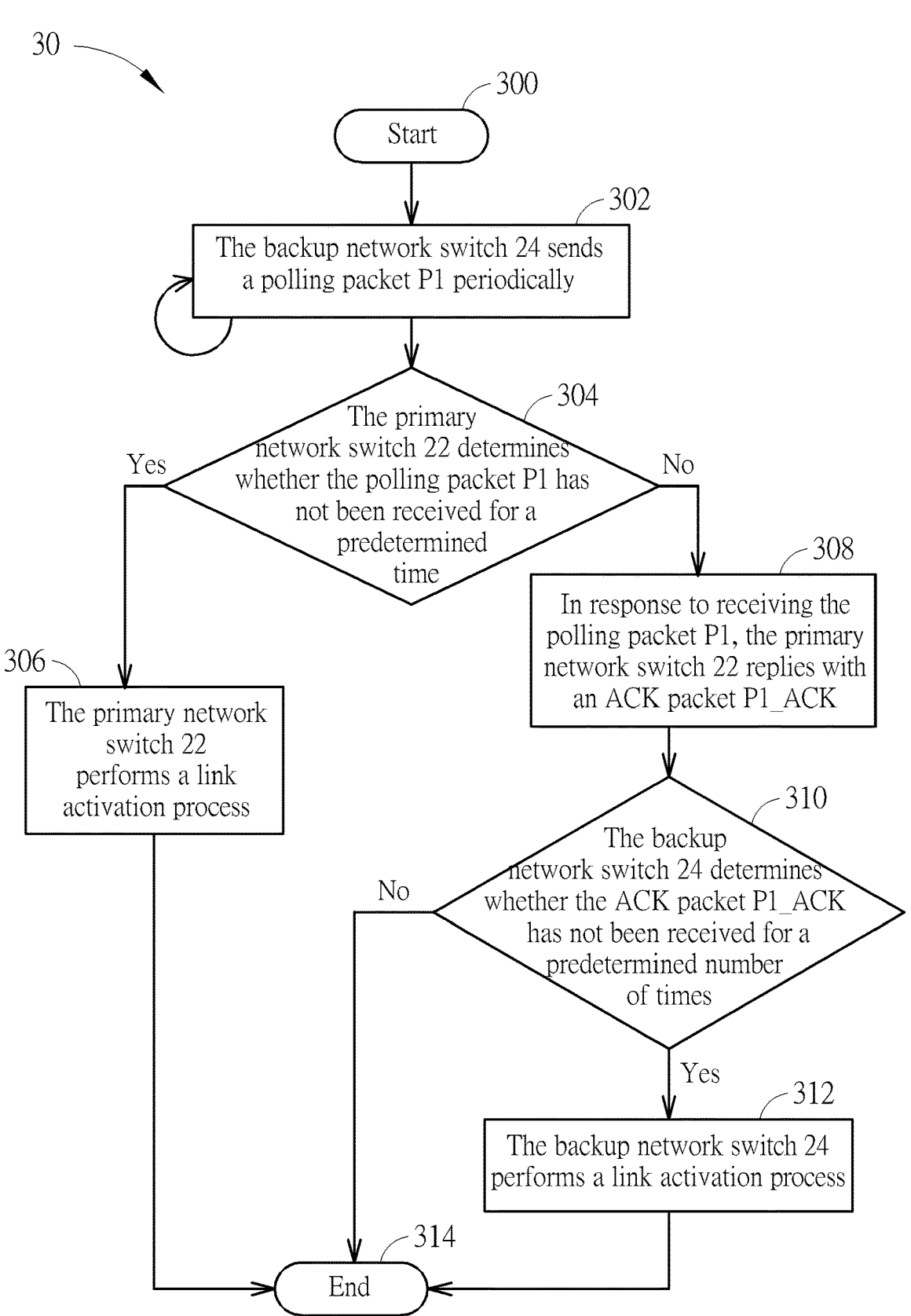
FIG. 3 is a schematic diagram of a polling process of a backup method of network coupling according to an embodiment of the present invention.

An implementation of the backup method of network coupling in the network system 1 may be summarized into a polling process 30 as shown in FIG. 3. The polling process 30 comprises the following steps:

Step 300: Start.

Step 302: The backup network switch 24 sends a polling packet P1 periodically.

Step 304: The primary network switch 22 determines whether the polling packet P1 has not been received for a predetermined time. If yes, proceed to Step 306; otherwise, proceed to Step 308.

Step 306: The primary network switch 22 performs a link activation process.

Step 308: In response to receiving the polling packet P1, the primary network switch 22 replies with an ACK packet P1_ACK.

Step 310: The backup network switch 24 determines whether the ACK packet P1_ACK has not been received for a predetermined number of times. If yes, proceed to Step 312; otherwise, proceed to Step 314.

Step 312: The backup network switch 24 performs a link activation process.

Step 314: End.

Figure 4:
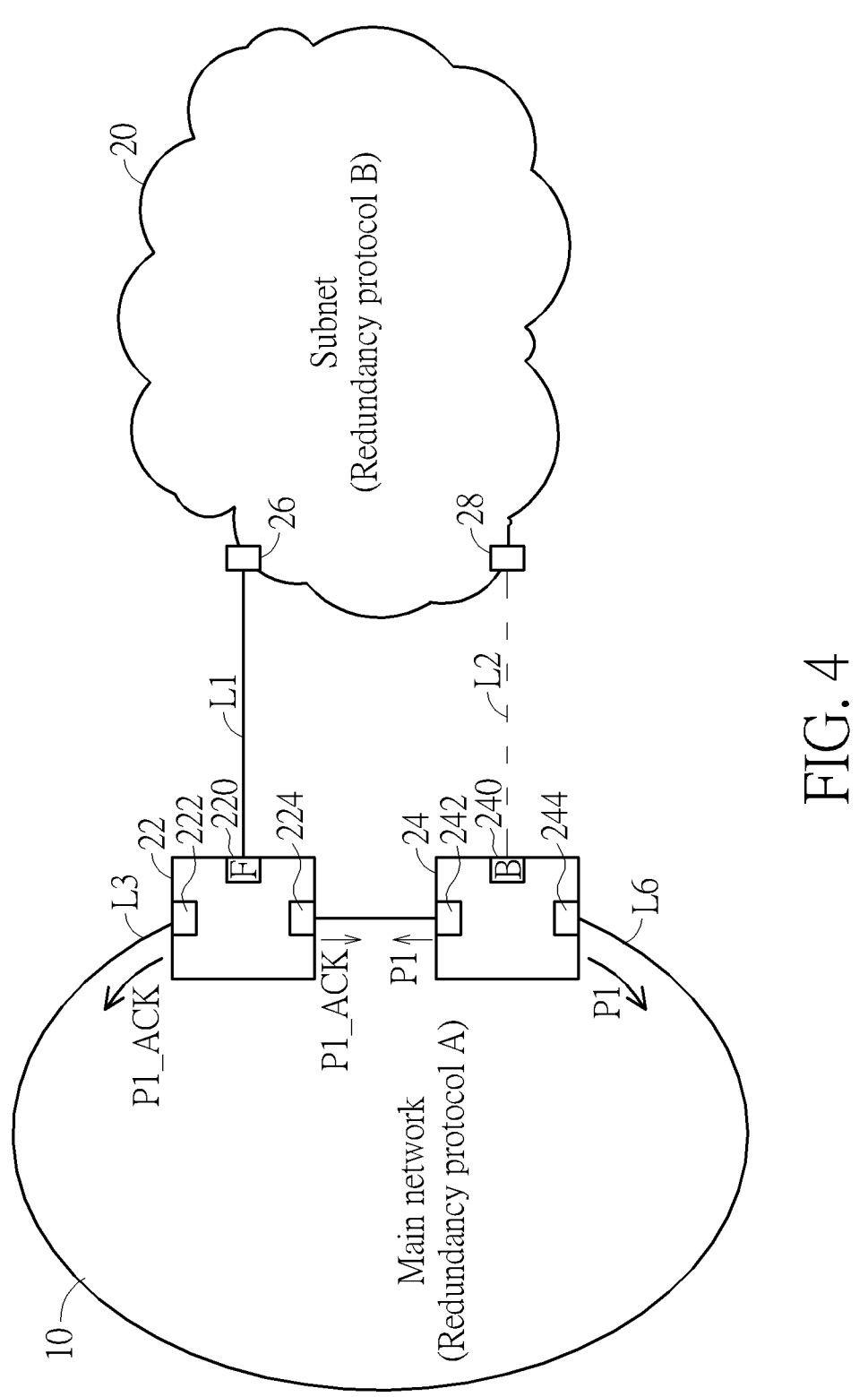
FIG. 4 is a schematic diagram of an implementation of a network system executing a polling process according to an embodiment of the present invention.

Please refer to FIG. 4 at the same time, which is a schematic diagram of an implementation of the network system 1 executing the polling process 30 according to an embodiment of the present invention. According to the poling process 30, the backup network 24 periodically sends a polling packet P1 to the main network 10 through the ports 242 and 244 (Step 302), and determines a status of the primary network switch 22 according to whether the primary network switch 22 replies with an ACK packet P1_ACK (Step 310). After receiving the polling packet P1, the primary network switch 22 may send the ACK packet P1_ACK to the main network 10 through the ports 222 and 224 (Step 308). If the backup network switch 24 periodically sends polling packets P1 but has not received the ACK packet P1_ACK for a predetermined number of times, the backup network switch 24 may determine that the primary network switch 22 has failed (such as a power outage or malfunction). Therefore, the backup network switch 24 has to perform a link activation process to enable the link L2 to communicate with the subnet 20 (Step 312). Another situation where the ACK packet P1_ACK is not received by the backup network switch 24 may be caused by the simultaneous failure of all links (both of the links L3 and L4) between the primary network switch 22 and the main network 10. In this situation, the backup network switch 24 also has to perform the link activation process to enable the link L2 to communicate with the subnet 20 (Step 312). Moreover, when all the links (L5, L6) between the backup network switch 24 and the main network 10 fail simultaneously, the backup network switch 24 also needs to perform the link activation process to enable the link L2 between the main network 10 and the subnet 20 for communication (Step 312). On the contrary, when the backup network switch 24 continues to receive the ACK packet P1_ACK from the primary network switch 22, the backup network switch 24 may determine that the primary network switch 22 is operating normally, so the backup network switch 24 may maintain the standby state. It should be noted, when the backup network switch 24 has just been turned on, the backup network switch 24 does not perform the link activation process during the stage when the ACK packet P1_ACK has not yet been received, so that unnecessary link switching may be avoided and the stability of the system may be ensured.

On the other hand, when the polling packet P1 sent periodically from the backup network switch 24 has not been received for a predetermined time (Step 304), the primary network switch 22 may determine that the backup network switch 24 has failed and perform the link activation process to enable the link L1 to communicate with the subnet 20 (Step 306). Similarly, another situation where the polling packet P1 is not received by the primary network switch 22 may be caused by the simultaneous failure of all links (both of the links L5 and L6) between the backup network switch 24 and the main network 10. In this situation, the primary network switch 22 also has to perform the link activation process to enable the link L1 to communicate with the subnet 20 (Step 306). Furthermore, when all the links (L3, L4) between the primary network switch 22 and the main network 10 fail simultaneously, the primary network switch 22 also needs to perform the link activation process to enable the link L1 between the main network 10 and the subnet 20 for communication (Step 306). It should be noted, the link activation process performed by the primary network switch 22 is limited to the situation when the backup network switch 24 provides backup for the primary network switch 22 through the link L2. That is to say, when the primary network switch 22 and the link L1 are operating normally and communicate with the subnet 20 via the link L1, there is no need to perform the link activation process for the link L1.

Figure 5:
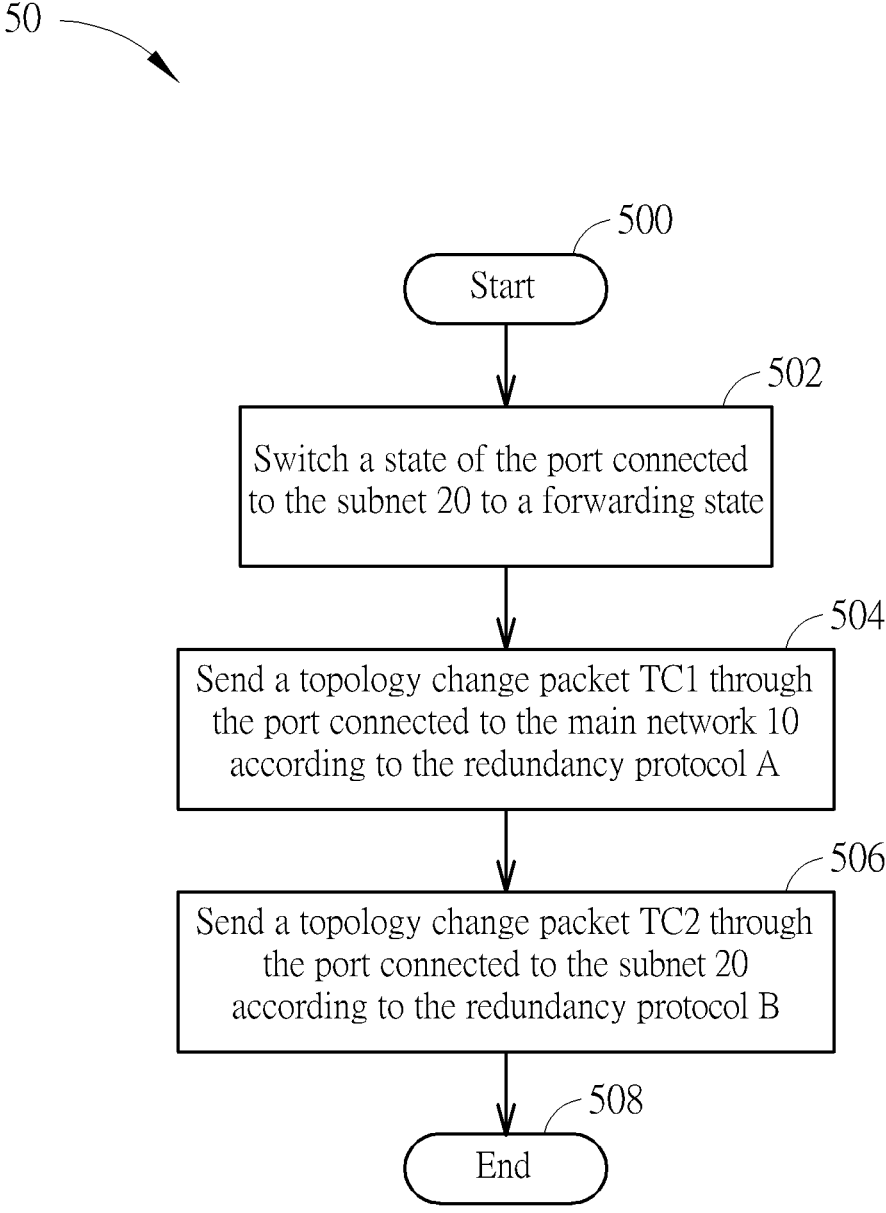
FIG. 5 is a schematic diagram of a link activation process of a backup method of network coupling according to an embodiment of the present invention.

The link activation process performed by the primary network switch 22 and the backup network switch 24 may be summarized into a link activation process 50 as shown in FIG. 5. The link activation process 50 comprises the following steps:

Step 500: Start.

Step 502: Switch a state of the port connected to the subnet 20 to a forwarding state.

Step 504: Send a topology change packet TC1 through the port connected to the main network 10 according to the redundancy protocol A.

Step 506: Send a topology change packet TC2 through the port connected to the subnet 20 according to the redundancy protocol B.

Step 508: End.

Figure 6:
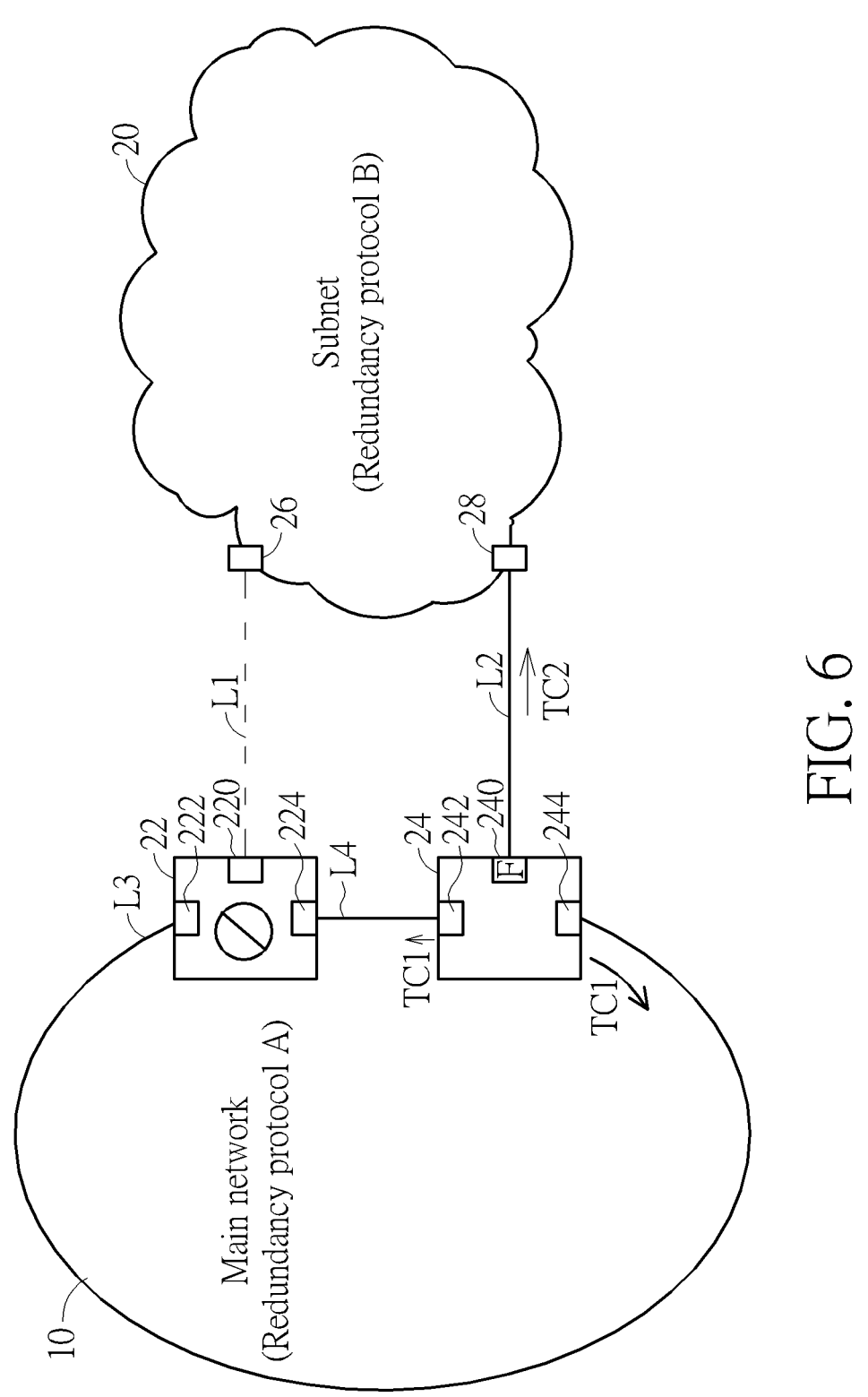
FIG. 6 is a schematic diagram of an implementation of a backup network switch executing a link activation process according to an embodiment of the present invention.

Please refer to FIG. 6 at the same time, which is a schematic diagram of an implementation of the backup network switch 24 executing the link activation process 50 according to an embodiment of the present invention. FIG. 6 illustrates the backup network switch 24 executing the link activation process 50 in Step 312 when the backup network switch 24 determines that the primary network switch 22 has failed in Step 310. As shown in FIG. 6, according to the link activation process 50, the backup network switch 24 first switches the state of the port 240 to a forwarding state (labeled F) in Step 502. Next, the backup network switch 24 has to notify the main network 10 and the subnet 20 of the need for a topology change respectively. In Step 504, the backup network switch 24 sends a topology change packet TC1 to the main network 10 through the ports 242 and 244 according to the redundancy protocol A, and the devices in the main network 10 may update the MAC address table (i.e., flush MAC) based on the topology change packet TC1. On the other hands, in Step 506, the backup network switch 24 sends a topology change packet TC2 to the subnet 20 through the port 240 according to the redundancy protocol B, and the devices in the subnet 20 may update the MAC address table based on the topology change packet TC2. Accordingly, the main network 10 and the subnet 20 are able to continue to operate the redundant protocols A and B respectively. It should be noted that although FIG. 6 illustrates the situation where the primary network switch 22 fails, the situation is also applicable when the links L3 and L4 fail at the same time.

Figure 7:
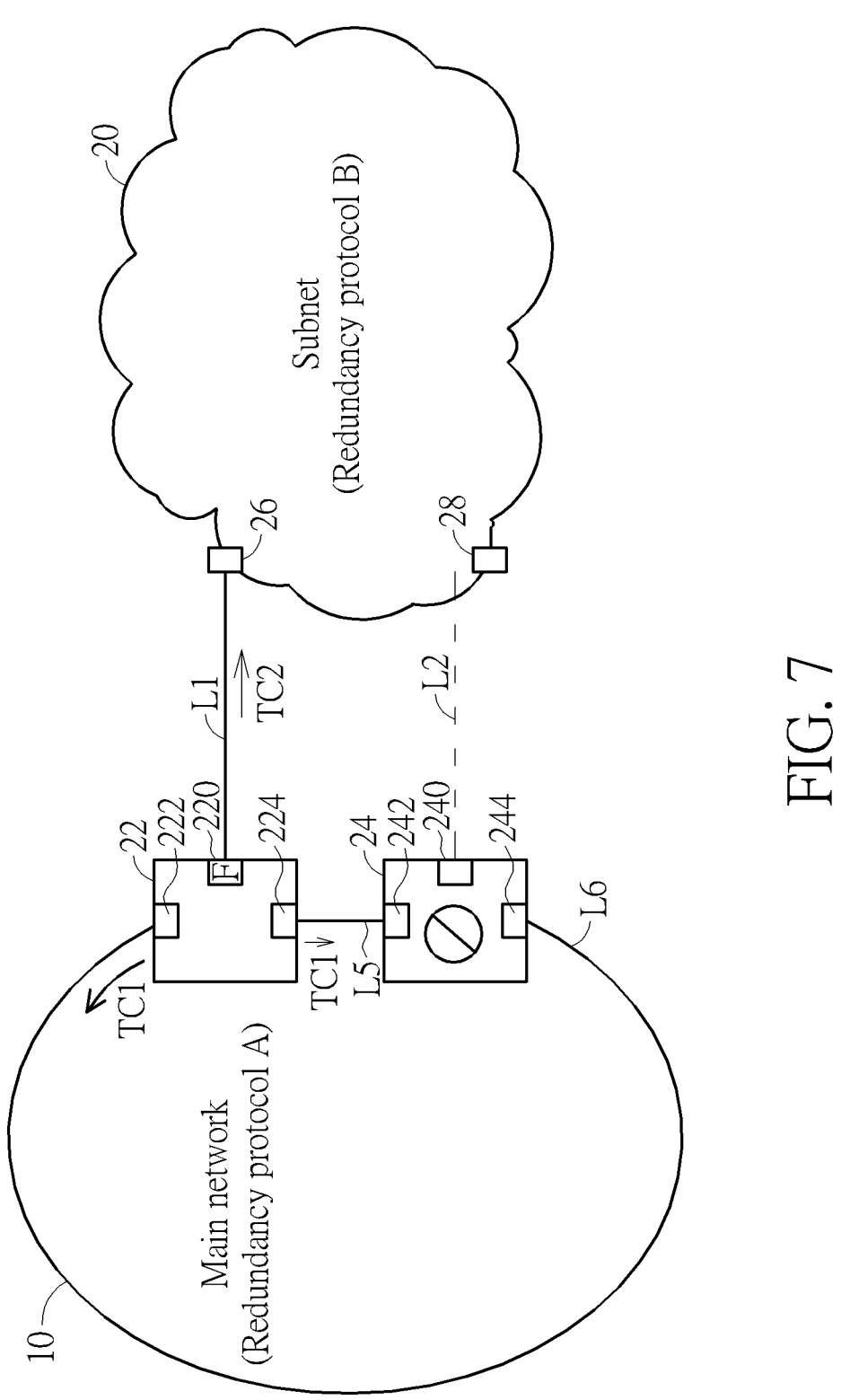
FIG. 7 is a schematic diagram of an implementation of a primary network switch executing a link activation process according to an embodiment of the present invention.

Please continue to refer to FIG. 7, which is a schematic diagram of an implementation of the primary network switch 22 executing the link activation process 50 according to an embodiment of the present invention. FIG. 7 illustrates the primary network switch 22 executing the link activation process 50 in Step 306 when the primary network switch 22 determines that the backup network switch 24 has failed in Step 304. As shown in FIG. 7, according to the link activation process 50, the primary network switch 22 first switches the state of the port 220 to a forwarding state (labeled F) in Step 502. Next, the primary network switch 22 has to notify the main network 10 and the subnet 20 of the need for a topology change respectively. In Step 504, the primary network switch 22 sends a topology change packet TC1 to the main network 10 through the ports 222 and 224 according to the redundancy protocol A, and the devices in the main network 10 may update the MAC address table based on the topology change packet TC1. On the other hands, in Step 506, the primary network switch 22 sends a topology change packet TC2 to the subnet 20 through the port 220 according to the redundancy protocol B, and the devices in the subnet 20 may update the MAC address table based on the topology change packet TC2. Accordingly, the main network 10 and the subnet 20 are able to continue to operate the redundant protocols A and B respectively. It should be noted that although FIG. 7 illustrates the situation where the backup network switch 24 fails, the situation is also applicable when both of the links L5 and L6 fail at the same time.

Figure 8:
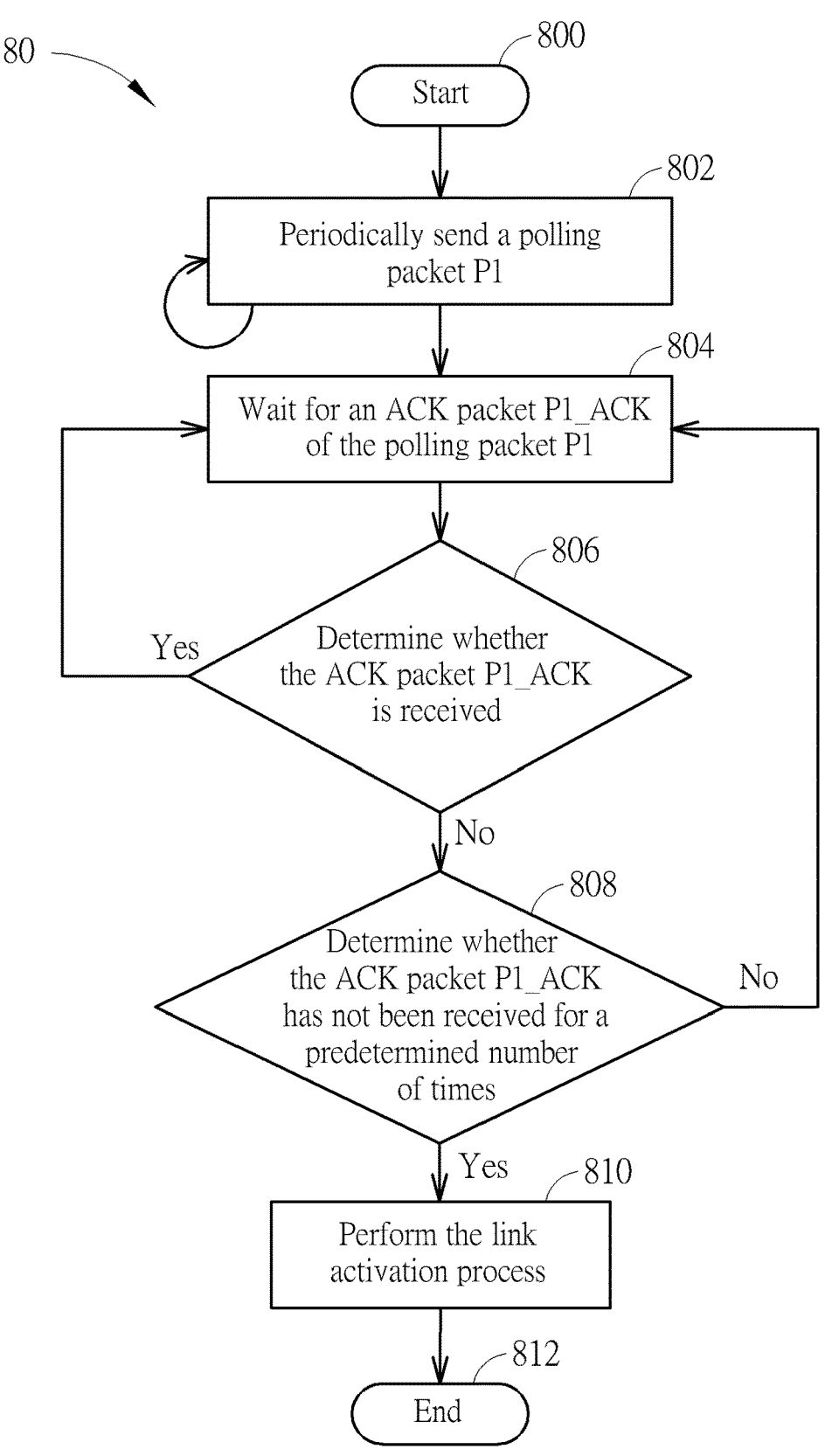
FIG. 8 is a schematic diagram of a backup network switch executing a polling process according to an embodiment of the present invention.

The method regarding the execution of the polling process 30 by the backup network switch 24 may be summarized into a process 80 as shown in FIG. 8. The process 80 comprises the following steps:

Step 800: Start.

Step 802: Periodically send a polling packet P1.

Step 804: Wait for an ACK packet P1_ACK of the polling packet P1.

Step 806: Determine whether the ACK packet P1_ACK is received. If yes, proceed to Step 804; otherwise, proceed to Step 808.

Step 808: Determine whether the ACK packet P1_ACK has not been received for a predetermined number of times. If yes, proceed to Step 810; otherwise, proceed to Step 804.

Step 810: Perform the link activation process.

Step 812: End.

According to the process 80, the backup network 24 periodically sends a polling packet P1 to the main network 10 through the ports 242 and 244 (Step 802), and waits for an ACK packet P1_ACK sent from the primary network switch 22 (Step 804) so as to monitor the status of the primary network switch 22. If the backup network switch 24 receives the ACK packet P1_ACK as expected, the backup network switch 24 may determine that the primary network switch 22 is operating normally and continue to wait for the next ACK packet P1_ACK. If the ACK packet P1_ACK is not received, further judgment is required (Step 806). When the backup network switch 24 does not receive the ACK packet P1_ACK from the primary network switch 22 for a predetermined number of times, the backup network switch 24 may determine that the primary network switch 22 has failed, and the link activation process needs to be performed to provide backup (Step 810) Accordingly, the backup network switch 24 switches the state of the port 240 to the forwarding state and notifies the main network 10 and the subnet 20 to update topology according to the redundancy protocols A and B respectively.

Figure 9:
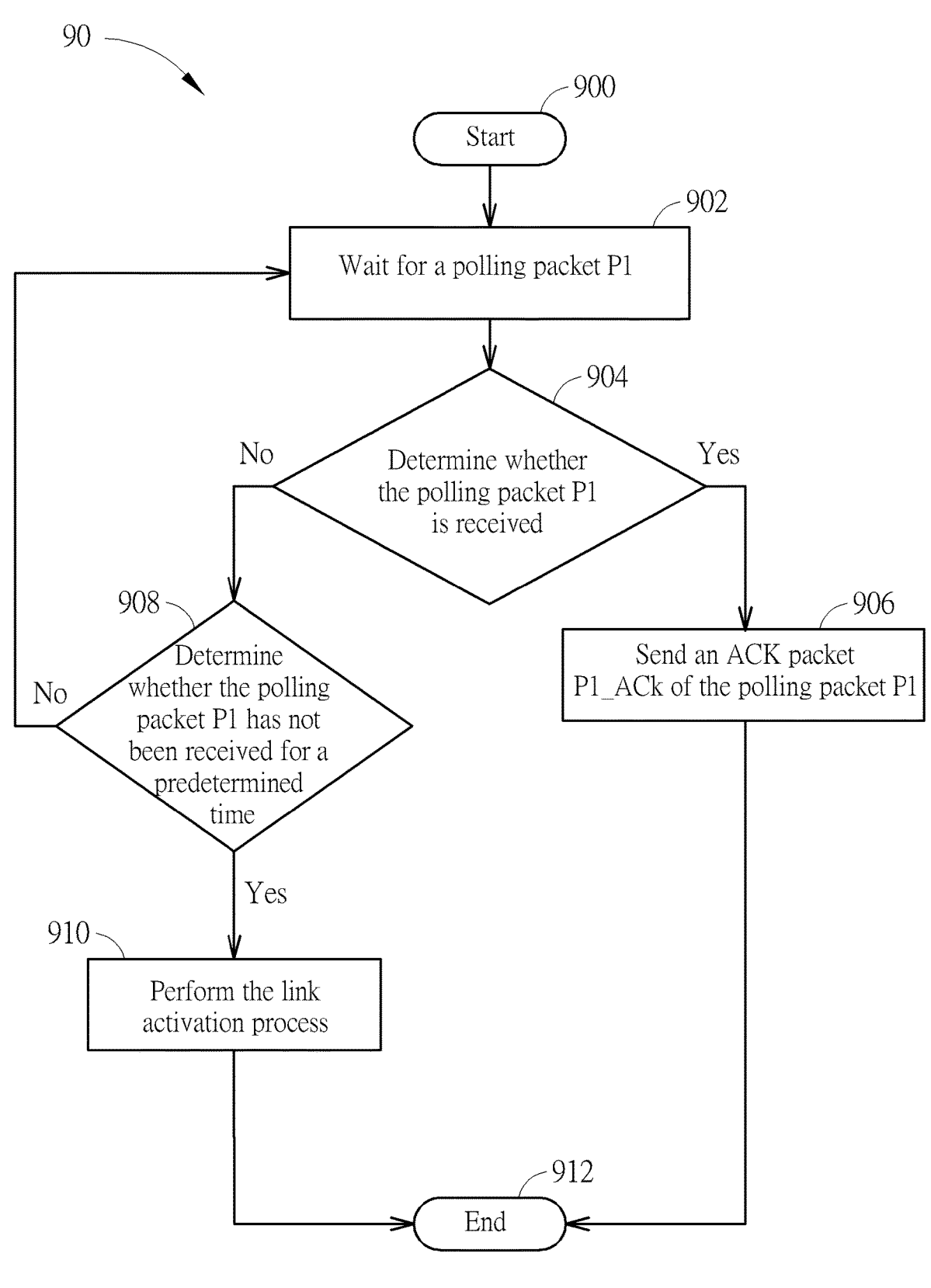
FIG. 9 is a schematic diagram of a primary network switch executing a polling process according to an embodi-ment of the present invention.

The method regarding the execution of the polling process 30 by the primary network switch 22 may be summarized into a process 90 as shown in FIG. 9. The process 90 comprises the following steps:

Step 900: Start.

Step 902: Wait for a polling packet P1.

Step 904: Determine whether the polling packet P1 is received. If yes, proceed to Step 906; otherwise, proceed to Step 908.

Step 906: Send an ACK packet P1_ACk of the polling packet P1.

Step 908: Determine whether the polling packet P1 has not been received for a predetermined time. If yes, proceed to Step 910; otherwise, proceed to Step 902.

Step 910: Perform the link activation process.

Step 912: End.

According to the process 90, the primary network switch 22 waits for a polling packet P1 from the backup network switch 24 and then sends an ACK packet P1_ACK of the polling packet P1 through the ports 222 and 224. Accordingly, in addition to reporting the status of the primary network switch 22, the primary network switch 22 may also monitor the status of the backup network switch 24. First, the primary network switch 22 continues to wait for the polling packet P1 from the backup network switch 24 (Step 902). If the primary network switch receives the polling packet P1, the primary network switch may determine that the backup network switch 24 is operating normally and continue to wait for the next polling packet P1. If the polling packet P1 is not received, further judgment is required (Step 904). After receiving the polling packet P1, the primary network switch 22 has to send an ACK packet P1_ACK to reply to the backup network switch 24 (Step 906). If the polling packet P1 is not received for a predetermined time (Step 908), the primary network switch 22 may determine that the backup network switch 24 has failed and have to perform the link activation process to connect the subnet 20 (Step 910). Accordingly, the primary network switch 22 switches the state of the port 220 to the forwarding state and notifies the main network 10 and the subnet 20 to update topology according to the redundancy protocols A and B respectively.

Accordingly, through the polling process 30, the primary network switch 22 and the backup network switch 24 of the network system 1 are capable of monitoring the status of each other, and enable the link connected to the subnet 10 for communication.

Furthermore, in addition to monitoring the status of the primary network switch 22 and the backup network switch 24, the network system 1 also needs to monitor the status of the links L1 and L2 at the same time, so that when any one of the links L1 and L2 fails, the link is able to be switched in time to maintain communication between the main network 10 and the subnet 20. In the embodiment of the present invention, an implementation of the backup method of network coupling in the network system 1 may be summarized into a link change process 100 as shown in FIG. 10. The link change process 100 comprises the following steps:

Step 1000: Start.

Step 1002: The primary network switch 22 detects the connection status of the link L1.

Step 1004: The primary network switch 22 determines whether the connection status of the link L1 has changed. If yes, proceed to Step 1006; otherwise, proceed to Step 1002.

Step 1006: The primary network switch 22 determines whether the connection status of the link L1 is a link-up status or a link-down status. If the connection status of the link L1 is a link-up status, proceed to Step 1008; otherwise, proceed to Step 1012.

Step 1008: The primary network switch 22 sends a link confirmation packet LT1 through the link L1.

Step 1010: In response to receiving the link confirmation packet or a timer expired, proceed to Step 1012.

Step 1012: The primary network switch 22 sends a link change packet LC1.

Step 1014: In response to receiving the link change packet LC1, the backup network switch 24 replies an ACK packet LC1_ACK.

Step 1016: The primary network switch 22 and the backup network switch 24 perform link change.

Step 1018: End.

According to the link change process 100, the primary network switch 22 has to monitor the connection status of the link L1 connected to the subnet 20 at any time, and the connection status may be determined to be a link-up status (connected) or a link-down status (non-connected) according to whether an electrical signal of the link L1 is detected (Step 1002). When the connection status of the link L1 changes, the primary network switch 22 needs to further determine the subsequent processing method (Step 1004). When the connection status of the link L1 changes from the link-up status to the link-down status, the backup network switch 24 needs to perform backup and switch the connection link between the main network 10 and the subnet 20 to the Link L2 (Steps 1012 to 1016); when the connection status of the link L1 changes from the link-down status to the link-up status, the primary network switch 22 needs to further send a link confirmation packet LT1 to the subnet 20 to confirm the status of the link L1, and switch the connection link between the main network 10 and the subnet 20 to the Link L1 (Steps 1008 to 1016). When link switching is required, the primary network switch 22 may send a link change packet LC1 to the main network 10 through the ports 222 and 224 to notify the backup network switch 24 to perform link change between the links L1 and L2 (Step 1012). After receiving the link change packet LC1, the backup network switch 24 may send an ACK packet LC1_ACK of the link change packet LC1 to the main network 10 through the ports 242 and 244, and then perform the link change. In Step 1016, the primary network switch 22 and the backup network switch have to perform the link change respectively. Step 1016 is similar to the aforementioned link activation process 50, where the primary network switch 22 and the backup network switch 24 need to change the state of the ports 220 and 240 corresponding to the links L1 and L2 connected to the subnet 20 and send topology change packets TC1 and TC2 to the main network 10 and the subnet 20 respectively.

Figure 11:
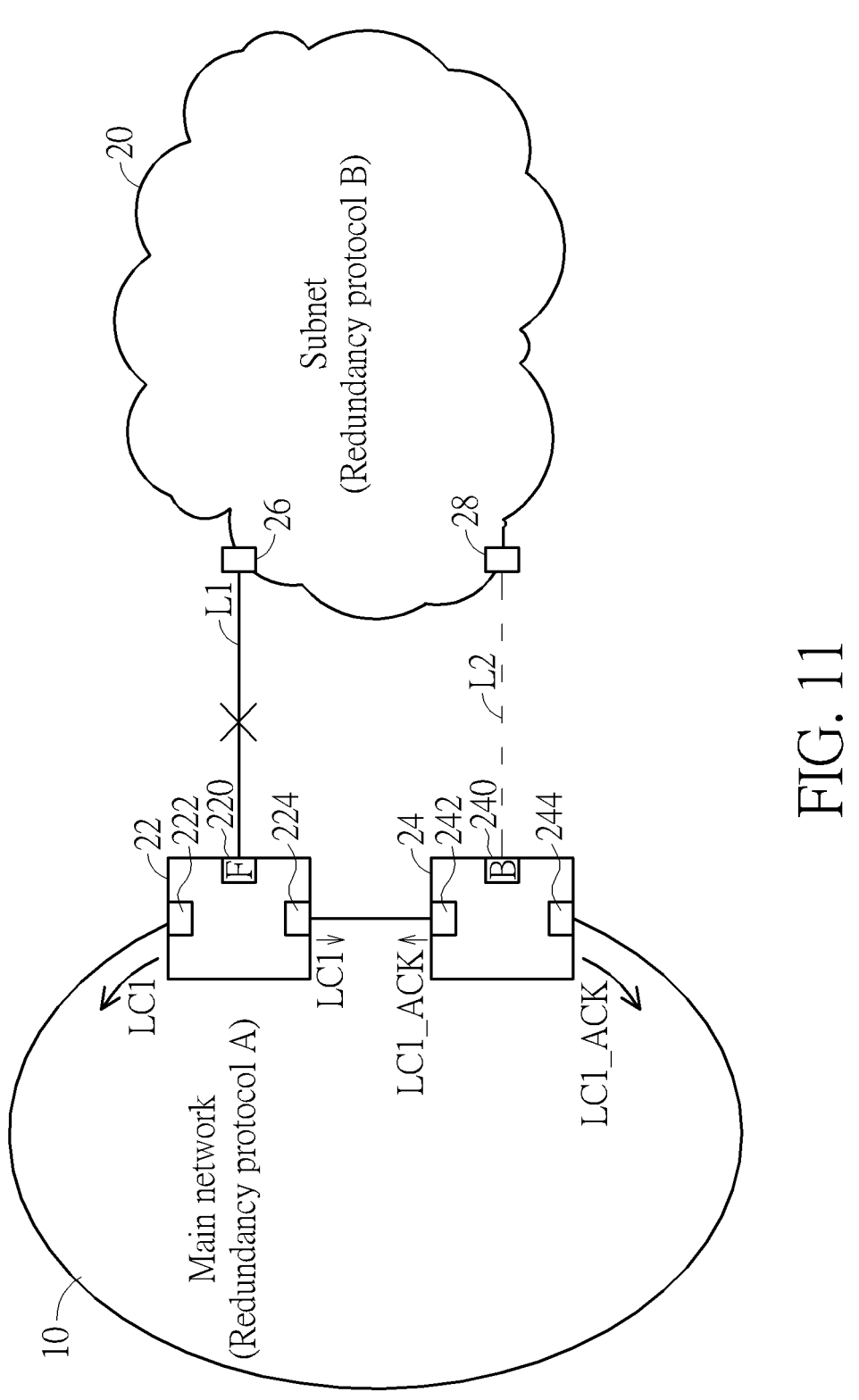
FIG. 11 is a schematic diagram of an implementation of a network system executing a link change process according to an embodiment of the present invention.
Figure 12:
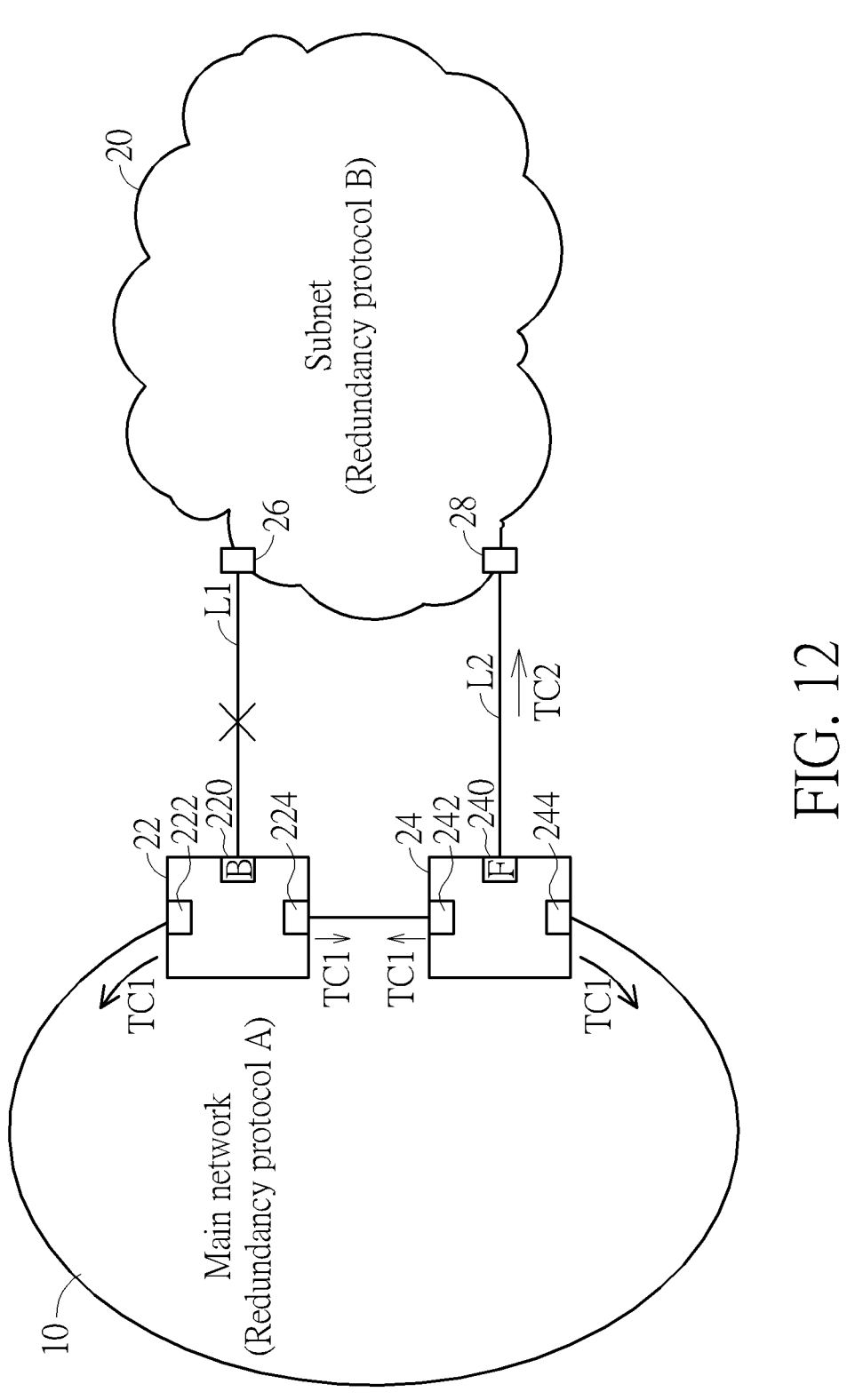
FIG. 12 is a schematic diagram of an implementation of a network system executing a link change process according to an embodiment of the present invention.

Please refer to FIG. 11 and FIG. 12, which are schematic diagrams of an implementation of the network system 1 executing the link change process 100 according to an embodiment of the present invention, where FIG. 11 specifically illustrates the situation in which the connection status of the link L1 changes from a link-up status to a link-down status in Step 1006. In Step 1012, the primary network switch 22 may send the link change packet LC1 to the main network 10 through the ports 222 and 224. Next, in Step 1014, after receiving the link change packet LC1, the backup network switch 24 replies with an ACK packet LC1_ACK to the main network through the ports 242 and 244 and performs link change according to the indication of the link change packet LC1.

As shown in FIG. 12, after receiving the link change packet LC1, the backup network switch 24 activates the link L2 to communicate with the subnet 20 according to the indication of the link change packet LC1. Similar to the link activation process 50, the backup network switch 24 needs to switch the state of the port 240 connected to the subnet 20 to the forwarding state (labeled F). Next, the backup network switch 24 needs to notify the main network 10 and the subnet 20 respectively that the network needs to update the topology. The backup network switch 24 sends a topology change packet TC1 to the main network 10 through the ports 242 and 244 according to the redundancy protocol A, so that the devices in the main network 10 are able to update the MAC address table according to the topology change packet TC1. On the other hand, the backup network switch 24 sends a topology change packet TC2 to the subnet 20 through the port 240 according to the redundancy protocol B, so that the devices in the subnet 20 are able to update the MAC address table according to the topology change packet TC2.

On the other hand, after receiving the ACK packet LC1_ACK from the backup network switch 24, the primary network switch 22 needs to switch the state of the port 220 connected to the subnet 20 to a blocking state (labeled B) and needs to notify the main network 10 and the subnet 20 respectively that the network needs to update the topology. Since the link L1 has failed, in this situation, the primary network switch 22 only needs to send the topology change packet TC1 to the main network 10 through the ports 222 and 224 according to the redundancy protocol A, so that the devices in the main network 10 are able to update the MAC address table according to the topology change packet TC1.

Figure 13A:
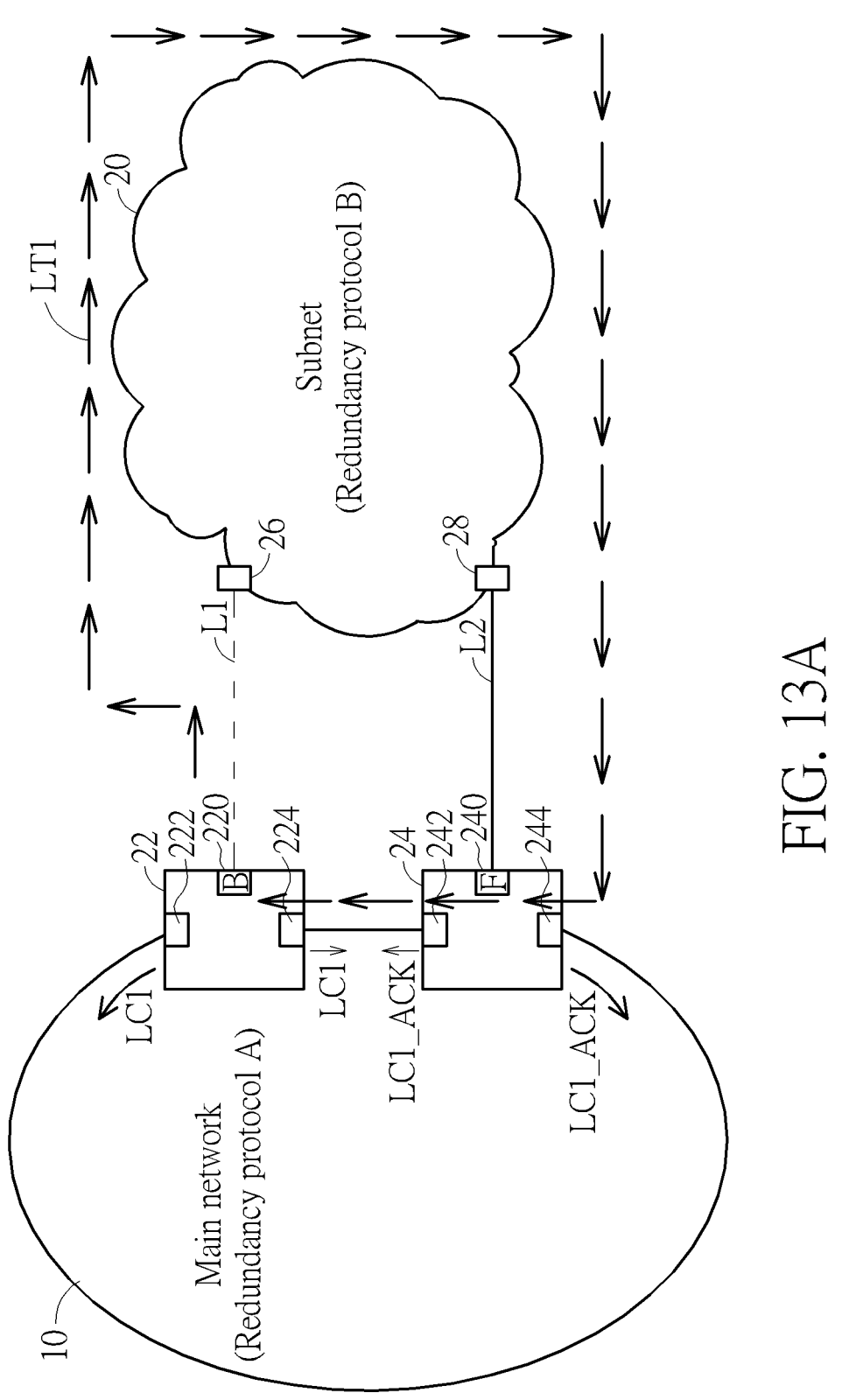
FIG. 13A and FIG. 13B are another implementation of a network system executing a link change process according to an embodiment of the present invention.
Figure 13B:
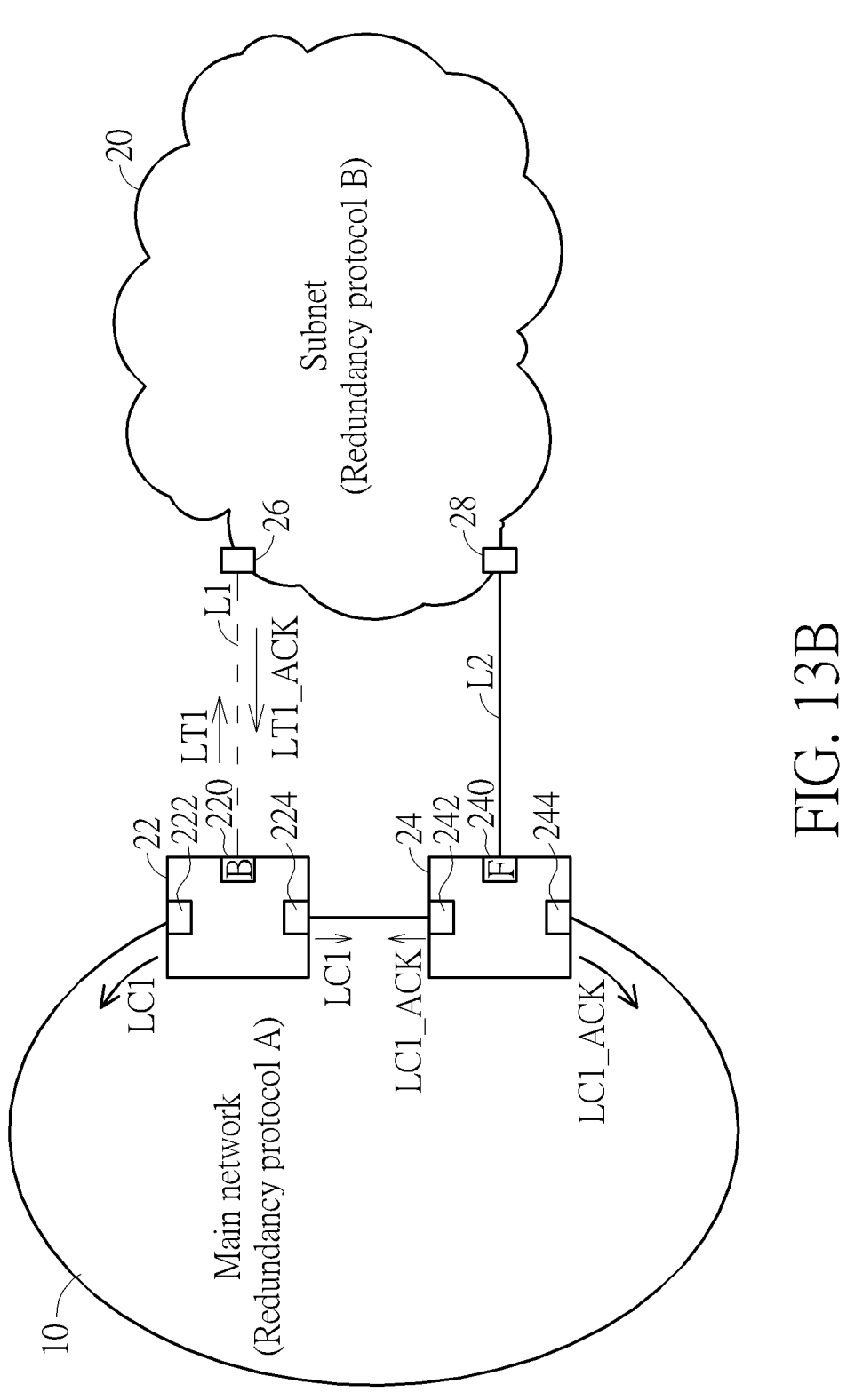
Figure 14:
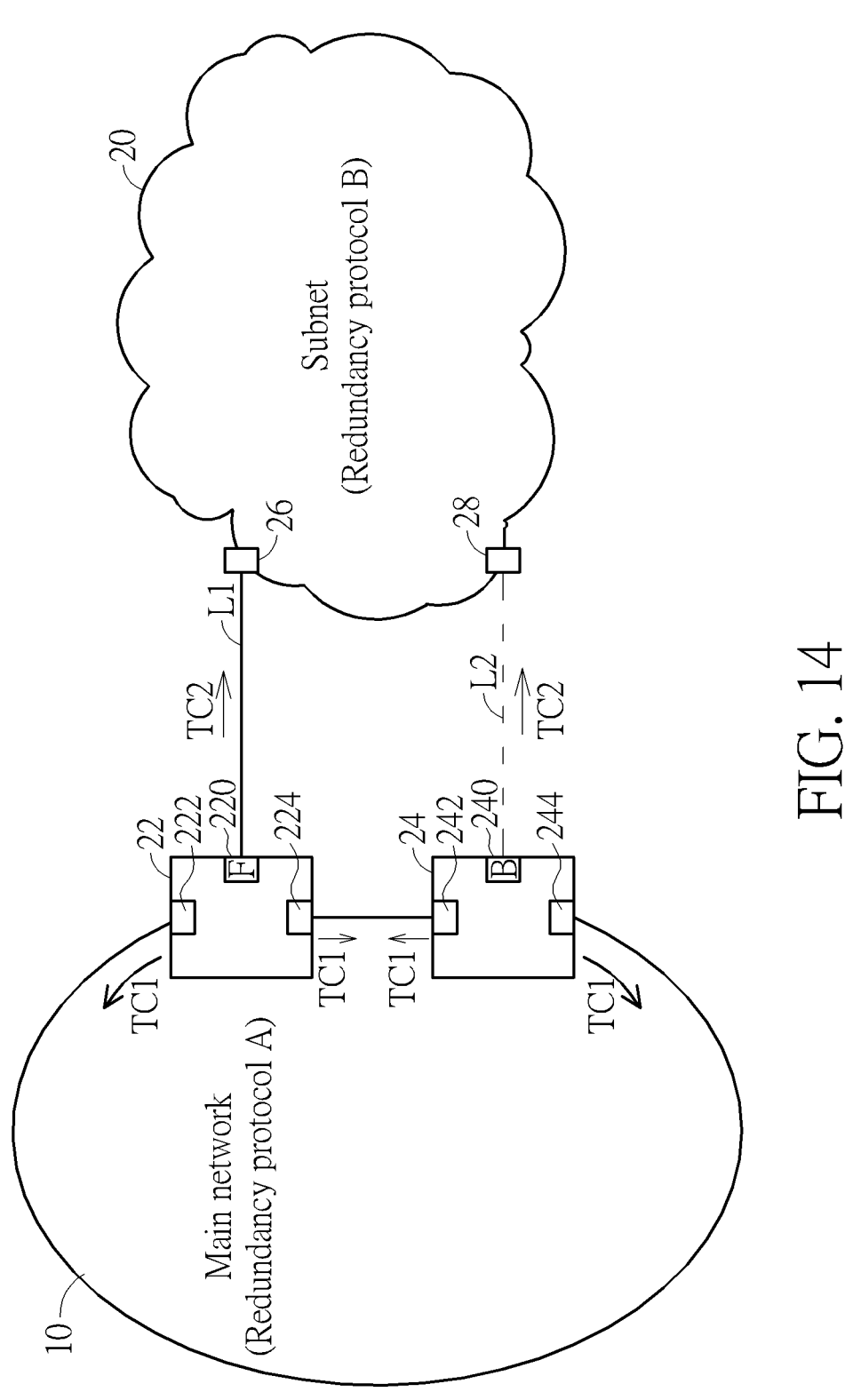
FIG. 14 is a schematic diagram of an implementation of a network system executing a link change process according to an embodiment of the present invention.

Please refer to FIG. 13A, FIG. 13B and FIG. 14, which are schematic diagrams of another implementation of the network system 1 executing the link change process 100 according to an embodiment of the present invention, where FIG. 13A and FIG. 13B specifically illustrate the situation in which the connection status of the link L1 is determined to be changed from a link-down status to a link-up status in Step 1006. In this situation, the communication between the main network 10 and the subnet 20 needs to be switched from the link L2 back to the link L1 and performed by the primary network switch 22, while the backup network switch 24 is on standby again.

In FIG. 13A, the primary network switch 22 may send a link confirmation packet LT1 to the subnet 20 additionally, so as to confirm the status of the network switch 26 of the subnet 20 connected to the link L1. In Step 1008, the primary network switch 22 may send the link confirmation packet LT1 through the link L1 via the port 220. The link confirmation packet LT1 sent by the primary network switch 22 of the main network 10 may be transmitted sequentially through the link L1, the subnet 20 and the link L2, and returned to the main network 10 again, and eventually be received by the primary network switch 22 through the port 222 or 224. Next, in Step 1010, after receiving the link confirmation packet LT1 transmitted through the subnet 20 and returned to the main network 10, the primary network switch 22 is able to confirm that the link L1 and the network switch 26 of the subnet 20 that is connected to the link L1 are ready, and thus the link change may be performed immediately. On the other hand, when the primary network switch 22 does not receive the link confirmation packet LT1 sent by itself, the primary network switch 22 may also wait for the timer to expire for link change. After receiving the link confirmation packet LT1 or the time expires, in Step 1012, the primary network switch 22 may send a link change packet LC1 to the main network 10 through the ports 222 and 224 to notify the backup network switch 24 to perform link change between the links L1 and L2. Next, in Step 1014, after receiving the link change packet LC1, the backup network switch 24 replies with an ACK packet LC1_ACK via the ports 242, 244 on the main network 10 and performs link change according to the indication of the link change packet LC1.

Please refer to FIG. 13B, in an embodiment, after receiving the link confirmation packet LT1 sent by the primary network switch 22, the network switch 26 connected to the link L1 may send an ACK packet LT1_ACK of the link confirmation packet LT1 to the primary network switch 22 through the link L1. In Step 1010, the primary network switch 22 waits for the ACK packet LT1_ACK from the network switch 26 or a timer to expire. If the network switch 26 is capable of recognizing the link confirmation packet LT1, the network switch 26 may reply with the ACK packet LT1_ACK. Though the ACK packet LT1_ACK, the primary network switch 22 may also confirm that the link L1 and the network switch 26 are ready, and immediately perform the link change. If the network switch 26 is not capable of recognizing the link confirmation packet LT1, the primary network switch 22 will not receive the ACK packet LT1_ACK from the network switch 26. In this situation, the primary network switch 22 will wait for the timer to expire before performing the link change.

In FIG. 14, after receiving the link change packet LC1, the backup network switch 24 blocks the link L2 according to the indication of the link change packet LC1 to stop communication with the subnet 20. Similar to the link activation process 50, the backup network switch 24 needs to switch the state of the port 240 connected to the subnet 20 to the blocking state. Next, the primary network switch 24 needs to notify the main network 10 and the subnet 20 network of the need for a topology change respectively. The backup network switch 24 sends a topology change packet TC1 to the main network 10 through the ports 242 and 244 according to the redundancy protocol A, so that the devices in the main network 10 are able to update the MAC address table according to the topology change packet TC1. On the other hand, the backup network switch 24 sends a topology change packet TC2 to the subnet 20 through the port 240 according to the redundancy protocol B, so that the devices in the subnet 20 are able to update the MAC address table according to the topology change packet TC2.

On the other hand, after receiving the ACK packet LC1_ACK from the backup network switch 24, the primary network switch 22 needs to switch the state of the port 220 connected to the subnet 20 to a forwarding state and needs to notify the main network 10 and the subnet 20 respectively that the network needs to update the topology. In this situation, the primary network switch 22 sends a topology change packet TC1 to the main network 10 through the ports 222 and 224 according to the redundancy protocol A, so that the devices in the main network 10 are able to update the MAC address table according to the topology change packet TC1. On the other hand, the primary network switch 22 sends a topology change packet TC2 to the subnet 20 through the port 220 according to the redundancy protocol B, so that the devices in the subnet 20 are able to update the MAC address table according to the topology change packet TC2.

Accordingly, the network system 1 monitors the status of the links L1 and L2, and switches links in time according to the status of the link L1 to maintain communication between the main network 10 and the subnet 20. In the embodiment of the present invention, the primary network switch 22 is capable of further confirming the connection status of the link L1 through the link confirmation packet LT1 or the ACK packet LT1_ACK of the link confirmation packet, and notifying the backup network switch 24 to perform the link change through the link change packet LC1. In addition, through the topology change packets TC1 and TC2, the primary network switch 2 and the backup network switch 24 are capable of notifying the main network 10 and the subnet 20 to update the MAC address table according to different redundancy protocols.

Figure 15:
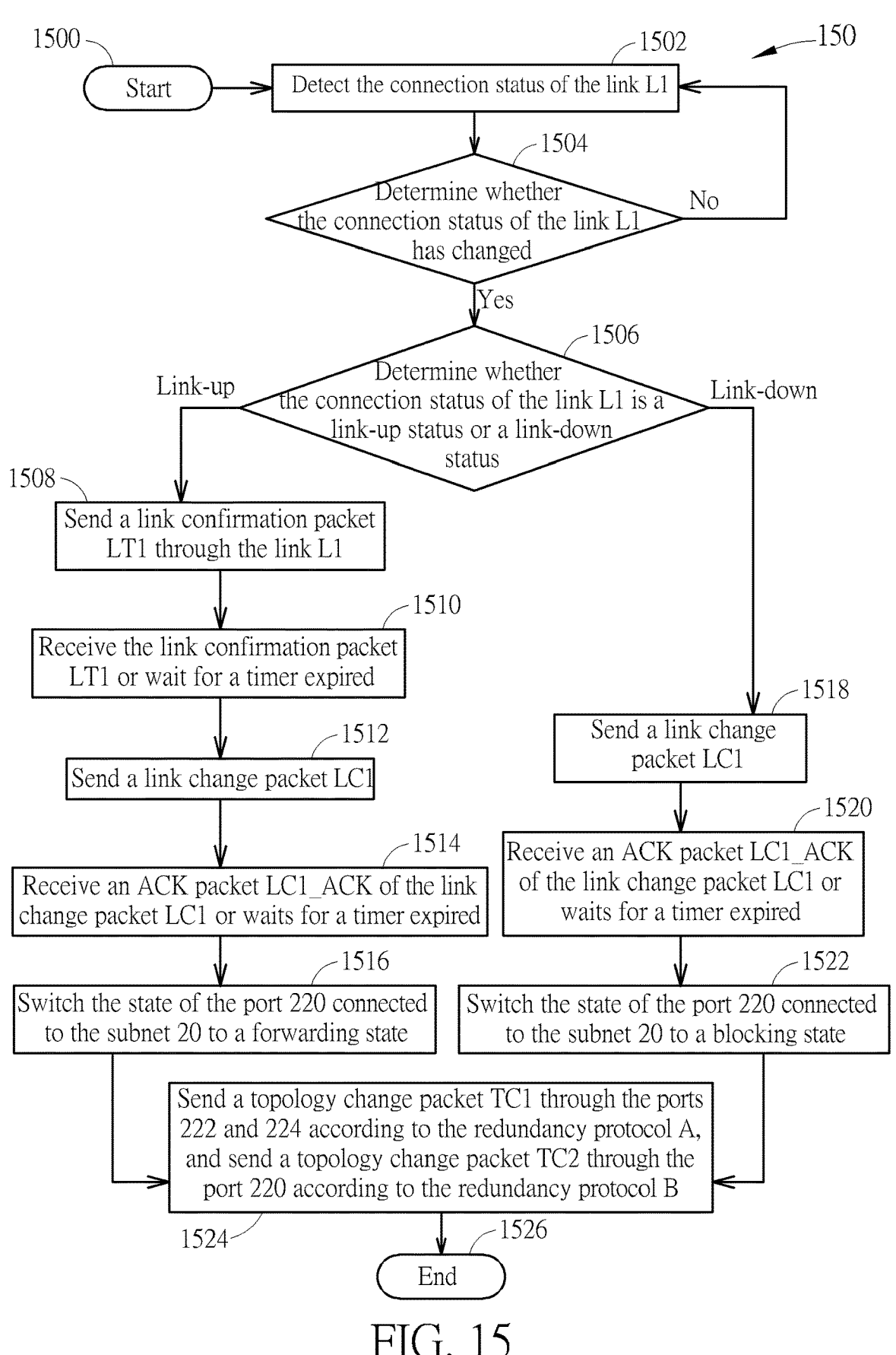
FIG. 15 is a schematic diagram of a primary network switch executing a link change process according to an embodiment of the present invention.

The method regarding the execution of the link change process 100 by the primary network switch 22 mentioned above may be summarized into a process 150 as shown in FIG. 15. The process 150 comprises the following steps:

Step 1500: Start.

Step 1502: Detect the connection status of the link L1.

Step 1504: Determine whether the connection status of the link L1 has changed. If yes, proceed to Step 1506; otherwise, proceed to Step 1502.

Step 1506: Determine whether the connection status of the link L1 is a link-up status or a link-down status. If the connection status of the link L1 is a link-up status, proceed to Step 1508; otherwise, proceed to Step 1518.

Step 1508: Send a link confirmation packet LT1 through the link L1.

Step 1510: In response to receiving the link confirmation packet LT1 or a timer expired, proceed to Step 1512.

Step 1512: Send a link change packet LC1.

Step 1514: In response to receiving an ACK packet LC1_ACK of the link change packet LC1 or a timer expired, proceed to Step 1516.

Step 1516: Switch the state of the port 220 connected to the subnet 20 to a forwarding state.

Step 1518: Send a link change packet LC1.

Step 1520: In response to receiving an ACK packet LC1_ACK of the link change packet LC1 or a timer expired, proceed to Step 1522.

Step 1522: Switch the state of the port 220 connected to the subnet 20 to a blocking state.

Step 1524: Send a topology change packet TC1 through the ports 222 and 224 according to the redundancy protocol A, and send a topology change packet TC2 through the port 220 according to the redundancy protocol B.

Step 1526: End.

Figure 16:
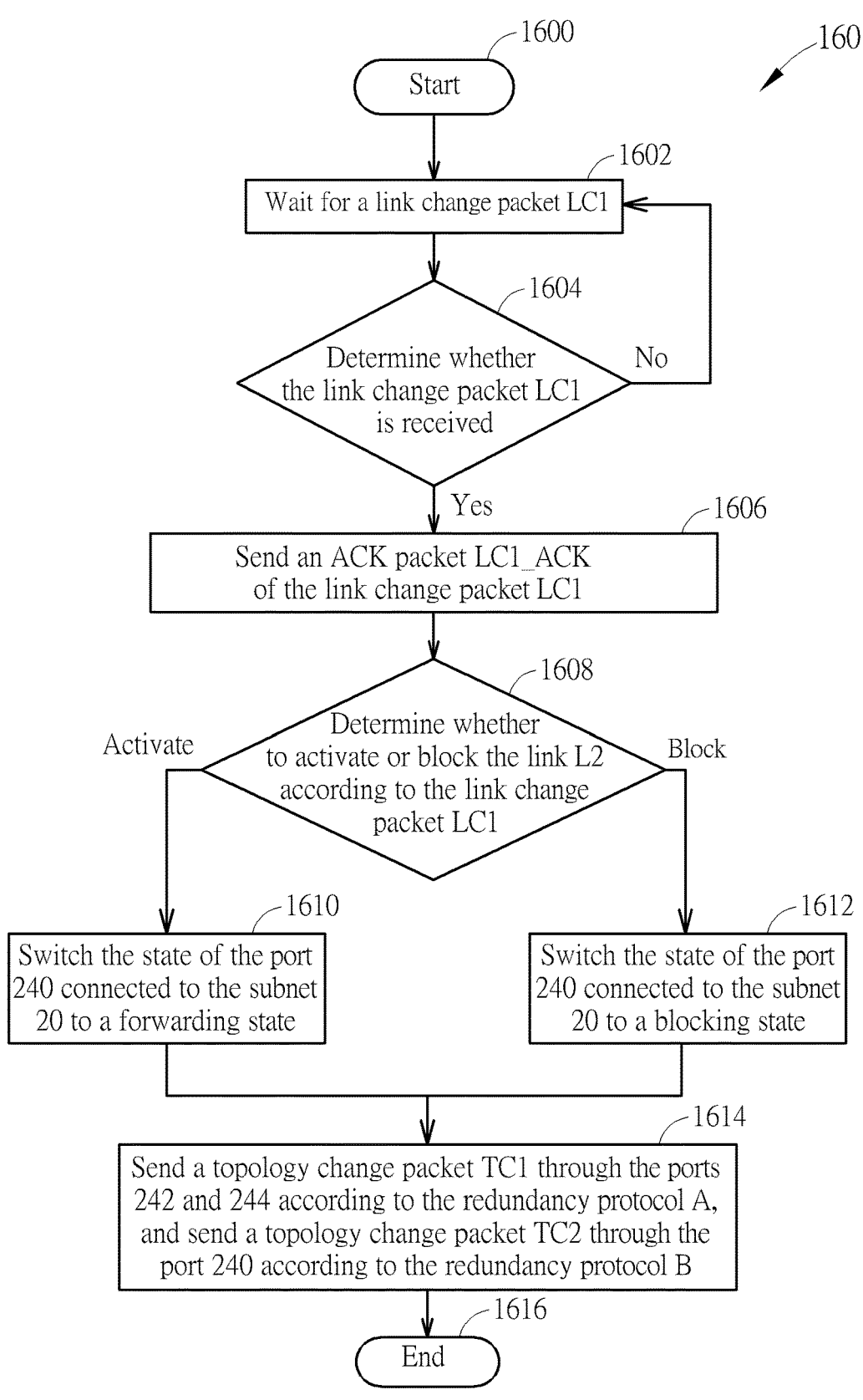
FIG. 16 is a schematic diagram of a backup network switch executing a link change process according to an embodiment of the present invention.

The method regarding the execution of the link change process 100 by the backup network switch 24 mentioned above may be summarized into a process 160 as shown in FIG. 16. The process 160 comprises the following steps:

Step 1600: Start.

Step 1602: Wait for a link change packet LC1.

Step 1604: Determine whether the link change packet LC1 is received. If yes, proceed to Step 1606; otherwise, proceed to Step 1602.

Step 1606: Send an ACK packet LC1_ACK of the link change packet LC1.

Step 1608: Determine whether to activate or block the link L2 according to the link change packet LC1. If it is determined to activate the link L2, proceed to Step 1610; otherwise, proceed to Step 1612.

Step 1610: Switch the state of the port 240 connected to the subnet 20 to a forwarding state.

Step 1612: Switch the state of the port 240 connected to the subnet 20 to a blocking state.

Step 1614: Send a topology change packet TC1 through the ports 242 and 244 according to the redundancy protocol A, and send a topology change packet TC2 through the port 240 according to the redundancy protocol B.

Step 1616: End.

Note that, in the embodiment of the present invention, the message exchange between the primary network switch 22 and the backup network switch 24 is through the polling packet P1, the ACK packet P1_ACK of the polling packet P1, the link change packet LC1 and the ACK packet LC1_ACK of the link change packet LC1, which are transmitted through the main network 10 and does not flow into the subnet 20. However, when the subnet is a chain network, the subnet 20 will not have sufficient redundancy mechanism to cope with any link failure within the network. Therefore, when a link failure occurs in the chain network, some network communication is interrupted. In this situation, in the embodiment of the present invention, the polling packet P1, the ACK packet P1_ACK of the polling packet P1, the link change packet LC1 and the ACK packet LC1_ACK of the link change packet LC1 are transmitted through the chain network so as to perform the message exchange between the primary network switch 22 and the backup network switch 24 and monitor the network status of the chain network. It should be noted, the method of transmitting the polling packet P1, the ACK packet P1_ACK of the polling packet P1, the link change packet LC1 and the ACK packet LC1_ACK of the link change packet LC1 through the chain network to perform the message exchange between the primary network switch 22 and the backup network switch 24 is also applicable to any subnet with various network topology, and is not limited to the chain network.

Figure 17:
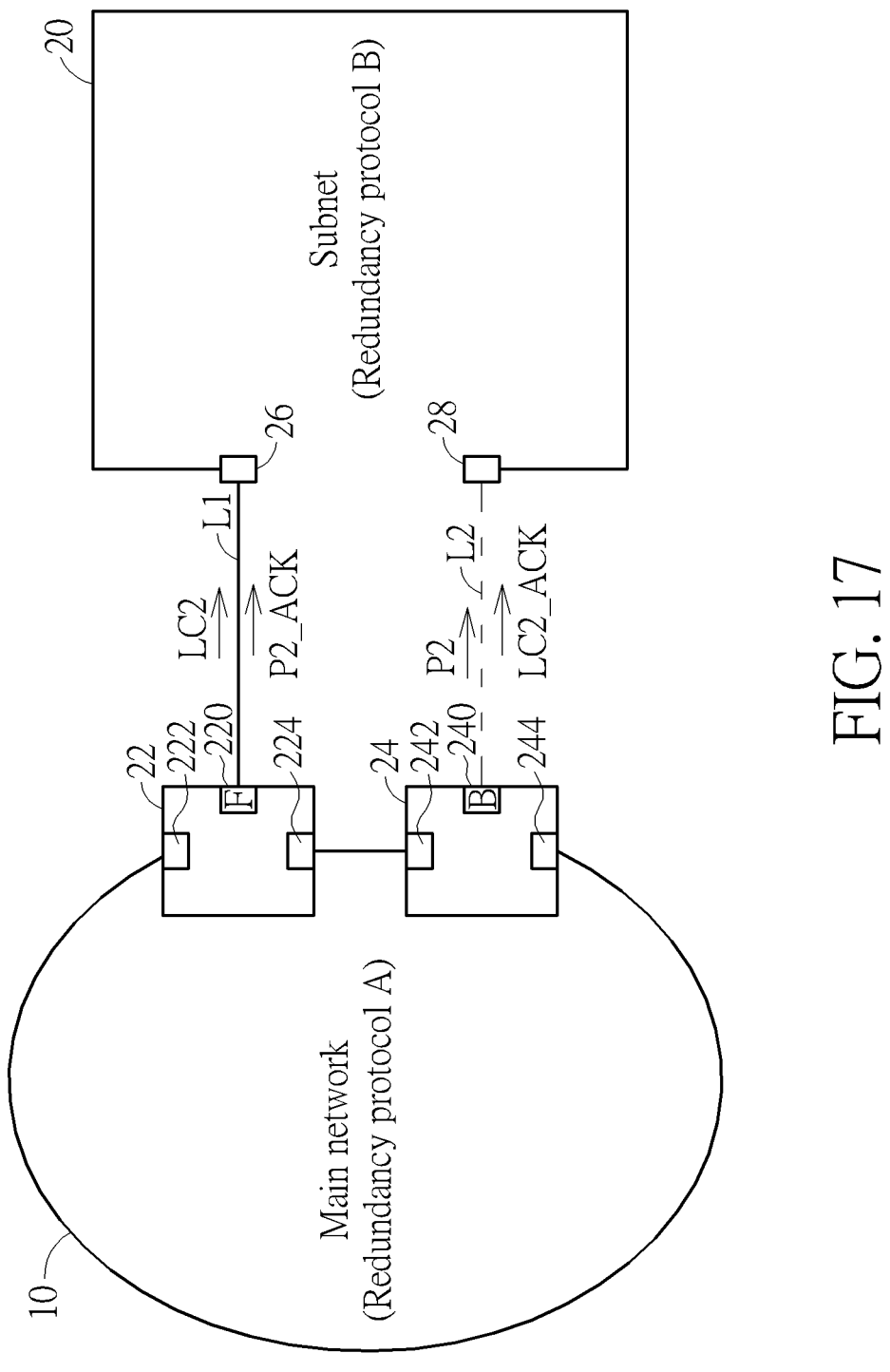
FIG. 17 is a schematic diagram of coupling a chain network according to an embodiment of the present inven-tion.

Please refer to FIG. 17, which is a schematic diagram of an embodiment of the present invention when the subnet 20 is a chain network. In FIG. 17, the network switches 26 and 28 are connected to the head and tail of the chain network and are connected to the primary network switch 22 and the backup network switch 24 via the links L1 and L2 respectively. In general, the port 220 of the primary network switch 22 is in a forwarding state for communication between the main network 20 and the chain network, and the port 240 of the backup network switch 24 is in a blocking state and is on standby as a backup for the primary network switch 22. According to the polling process 30, the backup network switch 24 periodically sends a polling packet P2 to the chain network through the link L2, and the primary network switch 22 receives the polling packet P2 from the chain network through the link L1. Similarly, the primary network switch 22 sends an ACK packet P2_ACK of the polling packet P2 to the chain network through the link L1, and the backup network switch 24 receives the ACK packet P2_ACK from the chain network through the link L2. When the primary network switch 22 does not receive the polling packet P2 for a predetermined time, the primary network switch 22 may determine that the backup network switch 24 has failed or the chain network is not available due to a link failure in the chain network. In this situation, the link L1 should be enabled to ensure that all network devices in the chain network are connected to the network. Similarly, when the backup network switch 24 does not receive the ACK packet P2_ACK for a predetermined number of times after sending the polling packet P2, the backup network switch 24 may determine that the primary network switch 22 has failed or the chain network is not available due to a link failure in the chain network. In this situation, the link L2 should be enabled to ensure that all network devices in the chain network are connected to the network. Similarly, according to the link change process 100, the link change packet LC2 and the ACK packet LC2_ACK thereof are also transmitted through the chain network. When the primary network switch 22 does not receive the ACK packet LC2_ACK for a predetermined number of times after sending the link change packet LC2, the primary network switch 22 may determine that the backup network switch 24 has failed or the chain network is not available due to a link failure in the chain network. In this situation, the link L1 should be enabled to ensure that all network devices in the chain network are connected to the network.

Figure 18:
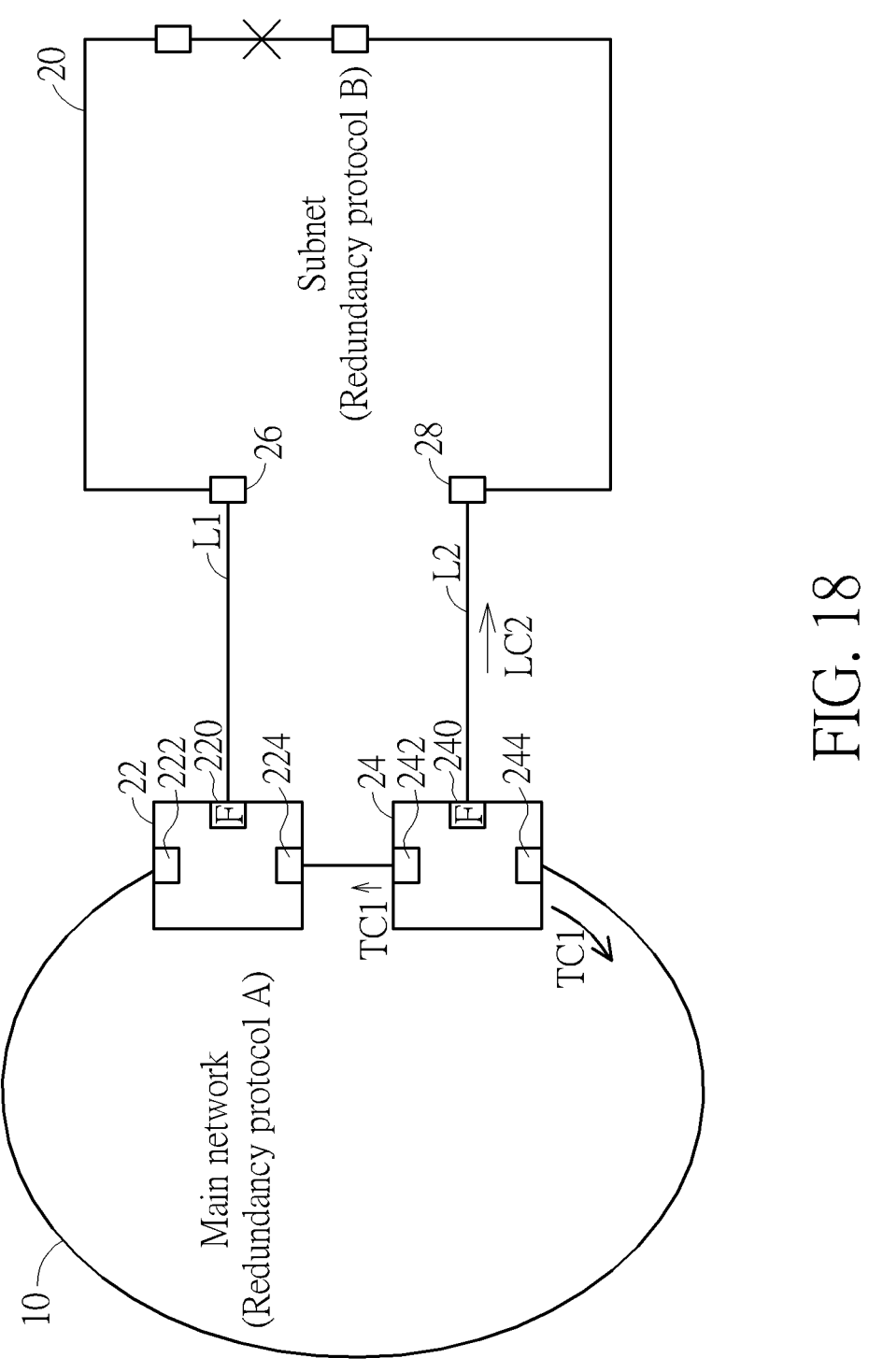
FIG. 18 is a schematic diagram of executing a backup method of network coupling for coupling a chain network according to an embodiment of the present invention.

Please refer to FIG. 18. FIG. 18 is a schematic diagram of an embodiment of the present invention when the subnet 20 is a chain network, which illustrates the situation where a link failure occurs in the chain network. In this situation, the backup network switch 24 periodically sends the polling packet P2 to the chain network through the link L2, but will not receive ACK packet P2_ACK from the primary network switch 22. Therefore, the backup network switch 24 needs to enable the link L2 to ensure that all network devices in the chain network are connected to the network. According to the link activation process 50, in Step 502, the backup network switch 24 first switches the state of the port 240 to a forwarding state. Next, the backup network switch 24 notifies the main network 10 and the chain network that a topology update is required respectively. In Step 504, the backup network switch sends a topology change packet TC1 to the main network 10 through the ports 242 and 244 according to the redundancy protocol A, and then the devices in the main network 10 may update the MAC address table according to the topology change packet TC1. On the other hand, in Step 506, the backup network switch sends a topology change packet TC2 to the chain network through the port 240 according to the redundancy protocol B, and then the devices in the chain network may update the MAC address table according to the topology change packet TC2. Accordingly, the communication between the chain network and the main network 20 may be ensured. It should be noted, FIG. 18 illustrates the failure of some links in a chain network, which is also applicable to the failure of the primary network switch 22.

In addition, in the embodiment of the present invention, all control packets must be transmitted and received through a port connected to the main network 10 or a port connected to the subnet 20. Taking the primary network switch 22 as an example, all control packets should be transmitted and received through the port 220 connected to the subnet 20 and the ports 222 and 224 connected to the main network 10. When the primary network switch 22 receives the control packet through ports other than the ports 220, 222, and 224, the primary network switch 22 may determine that an incorrect network connection occurs, which may cause a network loop. In this situation, the primary network switch 22 may switch the state of port 220 to a blocking state for a predetermined period of time and report an error message. Similarly, taking the backup network switch 24 as an example, all control packets should be transmitted and received through the port 240 connected to the subnet 20 and the ports 242 and 244 connected to the main network 10. When the backup network switch 24 receives the control packet through ports other than the ports 240, 242, and 244, the backup network switch 24 may determine that an incorrect network connection occurs, which may cause a network loop. In this situation, the backup network switch 24 may switch the state of port 240 to a blocking state for a predetermined period of time and report an error message. Accordingly, the embodiment of the present invention is capable of detecting incorrect network connections.

Figure 19:
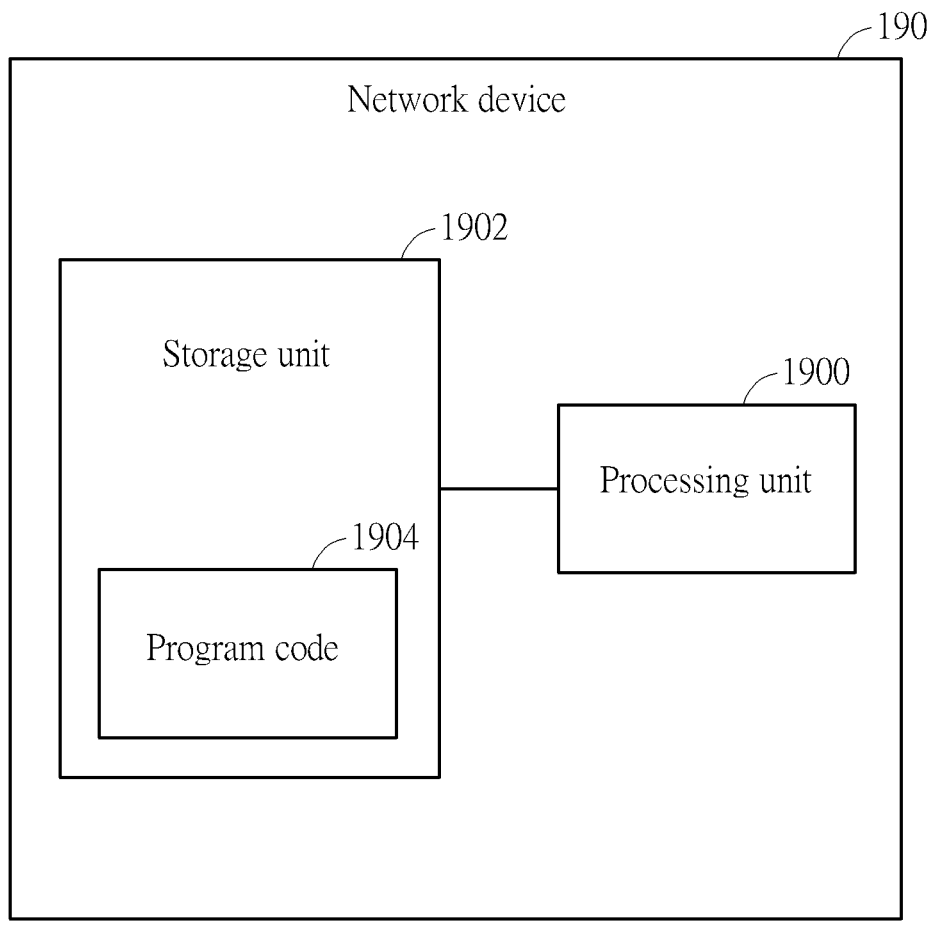
FIG. 19 is a schematic diagram of a network device according to an embodiment of the present invention.

Furthermore, please refer to FIG. 19, which is a schematic diagram of a network device 190 according to an embodiment of the present invention. The network device 190 may be used to implement the primary network switch 22 and the backup network switch 24 of the embodiment of the present invention. As shown in FIG. 19, the network device 190 may comprise a processing unit 1900 and a storage unit 1902. The processing unit 1900 may be a general-purpose processor, a microprocessor, an application-specific integrated circuit (ASIC), etc. or a combination thereof. The storage unit 1902 is coupled to the processing unit 1900 and may be any type of data storage devices for storing a program code 1904, and the program code 1904 is read and executed by the processing unit 1900. For example, the storage unit 1902 may be a read-only memory (ROM), a flash memory, a random-access memory (RAM), a hard disk, an optical data storage device, a non-volatile storage unit, etc., and is not limited thereto. In addition, the network device 190 further comprises a plurality of ports (not illustrated in FIG. 19) for connecting a plurality of network devices of a subnet and a main network.

The network device 190 is used to represent the necessary components required to implement the embodiments of the present invention, and those skilled in the art may make various modifications and adjustments accordingly, and is not limited to this. For example, when the network device 190 is applied to implement the primary network switch 22, the processes 80, 90 and 150 of the backup method of network coupling may be complied into the program code 1904, stored in the storage unit 1902, and executed by the processing unit 1900. When the network device 190 is applied to implement the backup network switch 24, the processes 50, 80 and 160 of the backup method of network coupling may be complied into the program code 1904, stored in the storage unit 1902, and executed by the processing unit 1900. Moreover, the storage unit 1902 is also used for storing the data required for running the backup method of network coupling, and is not limited thereto.

In summary, the present invention provides a network architecture, a network switch, and a backup method of network coupling thereof to enable the coupled networks to communicate with each other without interfering with each other while operating under different redundancy protocols, resulting in stable performance. Through the control packets, such as the polling packets, the link confirmation packets, and the link change packets, the network switches are capable of monitoring the network status and exchanging information therebetween for backup purposes. By sending the topology change packets with different redundancy protocols to different networks, the network switches are capable of notifying each network of the link change information without impacting the operation of each redundancy protocol. Furthermore, when coupled with a chain network, the monitoring and redundancy mechanism of the chain network is achieved by changing the sending direction of the polling packets and the link change packets. Thus, the present invention improves the drawbacks of the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A primary network switch in a main network for coupling a subnet, comprising:
   at least one first port, coupled to the main network operating with a first redundancy protocol;
   a second port, coupled to the subnet operating with a second redundancy protocol;
   a processing unit, configured to execute a program code; and
   a storage unit, coupled to the processing unit, storing the program code that instructs the processing unit to execute a backup method for network coupling, wherein the backup method comprises:
      sending a first control packet through the at least one first port;
      in response to sending the first control packet, receiving an acknowledgement (ACK) packet of the first control packet; and
      in response to receiving the ACK packet of the first control packet, switching a state of the second port, sending a second control packet through the at least one first port according to the first redundancy protocol to update a MAC address table of the main network, and sending a third control packet through the second port according to the second redundancy protocol to update a MAC address table of the subnet.

2. The primary network switch of claim 1, wherein the program code instructs the processing unit to perform the backup method in response to a link-down of the second port occurring, wherein the state of the second port is switched to a blocking state.

3. The primary network switch of claim 1, wherein the program code instructs the processing unit to perform the backup method in response to a primary link switching condition being satisfied, wherein the state of the second port is switched to a forwarding state, and the step of sending the first control packet through the at least one first port is in response to receiving a fourth control packet through the at least one first port or a timer being expired after sending the fourth control packet through the second port.

4. The primary network switch of claim 3, wherein the primary link switching condition is that a link of the second port resumes a link-up status or all links of the at least one first port are in a link-down status.

5. The primary network switch of claim 3, wherein the backup method further comprises receiving a fifth control packet from a backup network switch of the main network coupled to the subnet, and in response to receiving the fifth control packet, sending an ACK packet of the fifth control packet.

6. The primary network switch of claim 5, wherein the primary link switching condition is in response to not receiving the fifth control packet for a predetermined time.

7. The primary network switch of claim 5, wherein the first control packet and the ACK packet of the fifth control packet are transmitted through the subnet via the second port.

8. The primary network switch of claim 7, wherein the subnet is a chain network.

9. The primary network switch of claim 8, wherein the primary link switching condition is in response to not receiving the fifth packet for a predetermined time or not receiving the ACK packet of the first control packet after sending the first control packet.

10. The primary network switch of claim 1, further comprising a third port, wherein when the primary network switch receives any control packet through the third port, the backup method further comprises switching the state of the second port to a blocking state for a predetermined time and reporting an error message.

11. A backup network switch in a main network for coupling a subnet, comprising:
   at least one first port, coupled to the main network operating with a first redundancy protocol;
   a second port, coupled to the subnet operating with a second redundancy protocol;
   a processing unit, configured to execute a program code; and
   a storage unit, coupled to the processing unit, storing the program code that instructs the processing unit to execute a backup method for network coupling, wherein the backup method comprises:
      switching a state of the second port; and
      sending a first control packet to update a MAC address table of the main network through the at least one port according to the first redundancy protocol; and
      sending a second control packet to update a MAC address table of the subnet through the second port according to the second redundancy protocol.

12. The backup network switch of claim 11, wherein the program code instructs the processing unit to perform the backup method in response to receiving a third control packet, wherein the backup method comprises sending an acknowledgement (ACK) packet of the third control packet through the at least one first port, and the state of the second port is switched to a blocking state or a forwarding state.

13. The backup network switch of claim 12, wherein the ACK packet of the third control packet is transmitted through the subnet via the second port.

14. The backup network switch of claim 13, wherein the subnet is a chain network.

15. The backup network switch of claim 11, wherein the program code instructs the processing unit to perform the backup method in response to all the links of the at least one first port being in a link-down status, wherein the state of the second port is switched to a forwarding state.

16. The backup network switch of claim 11, wherein the program code stored in the storage unit further instructs the processing unit to execute:
   periodically sending a fourth control packet through the at least one first port; and
   in response to not receiving an ACK packet of the fourth control packet from a primary network switch of the main network coupled to the subnet for a predetermined number of times, executing the backup method, wherein the state of the second port is switched to a forwarding state.

17. The backup network switch of claim 16, wherein the fourth control packet is transmitted through the subnet via the second port.

18. The backup network switch of claim 17, wherein subnet is a chain network.

19. The backup network switch of claim 11, further comprising a third port, wherein when the backup network switch receives any control packet through the third port, the backup method comprises switching the state of the second port to a blocking state for a predetermined time and reporting an error message.

20. A network architecture for network coupling, comprising:

a subnet, operating with a first redundancy protocol;

a main network, operating with a second redundancy protocol;

a primary network switch, disposed in the main network, coupled to the main network through at least one first port and coupled to the subnet through a second port; and a backup network switch, disposed in the main network, coupled to the main network through at least third port and coupled to the subnet through a fourth port;

wherein the primary network switch and the backup network switch execute a backup method for network coupling, and the backup method comprises:

sending, by the primary network switch, a first control packet through the at least one first port;

in response to receiving the first control packet, the backup network switch sending an acknowledgement (ACK) packet of the first control packet and performing link change, sending a second control packet to update a MAC address table of the main network through the at least third port according to the second redundancy protocol, and sending a third control packet to update a MAC address table of the subnet through the fourth port according to the first redundancy protocol; and in response to receiving the ACK packet of the first control packet, the primary network switch performing link change, sending a fourth control packet to update the MAC address table of the main network through the at least one first port according to the second redundancy protocol, and sending a fifth control packet to update the MAC address table of the subnet through the second port according to the first redundancy protocol.

21. The network architecture of claim 20, wherein the primary network switch and the backup network switch execute the backup method in response to a link of the second port of the primary network switch being in a link-down status.

22. The network architecture of claim 20, wherein the primary network switch and the backup network switch execute the backup method in response to a primary link switching condition being satisfied, and the step of the primary network switch sending the first control packet through the at least one first port is in response to the primary network switch receiving a sixth control packet through the at least one first port or a timer being expired after sending the sixth control packet through the second port.

23. The network architecture of claim 22, wherein the primary link switching condition is that a link of the second port resumes a link-up status or all links of the at least one first port are in a link-down status.

24. The network architecture of claim 22, wherein the backup network switch periodically sends a seventh control packet through the at least one third port, and in response to receiving the seventh control packet, the primary network switch sends an ACK of the seventh control packet.

25. The network architecture of claim 24, wherein the primary link switching condition is in response to the primary network switch not receiving the seventh control packet for a predetermined time.

26. The network architecture of claim 24, wherein the first control packet and the ACK packet of the seventh packet are transmitted through the subnet via the second port, and the ACK packet of the first control packet and the seventh packet are transmitted through the subnet via the fourth port.

27. The network architecture of claim 26, wherein the subnet is a chain network.

28. The network architecture of claim 27, wherein the primary link switching condition is in response to the primary network switch not receiving the seventh control packet for a predetermined time or not receiving the ACK packet of the first control packet after sending the first control packet.

29. The network architecture of claim 23, wherein the backup network switch further executes in response to not receiving the ACK packet of the seventh control packet from the primary network switch for a predetermined number of times, executing the backup method, wherein the state of the fourth port is switched to a forwarding state.

30. The network architecture of claim 24, wherein the backup network switch executes the backup method in response to all links of the at least one third port being in a link-down status, wherein the state of the fourth port is switched to a forwarding state.

* * * * *